(12) United States Patent
Ahn et al.

(10) Patent No.: US 12,363,336 B2
(45) Date of Patent: *Jul. 15, 2025

(54) IMAGE DECODING METHOD/APPARATUS, IMAGE ENCODING METHOD/APPARATUS, AND RECORDING MEDIUM STORING BITSTREAM

(71) Applicant: Intellectual Discovery Co., Ltd., Seoul (KR)

(72) Inventors: Yong Jo Ahn, Seoul (KR); Ho Chan Ryu, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,984

(22) Filed: Jun. 28, 2023

(65) Prior Publication Data

US 2023/0345034 A1    Oct. 26, 2023

Related U.S. Application Data

(63) Continuation of application No. 17/736,324, filed on May 4, 2022, now Pat. No. 11,729,410, which is a
(Continued)

(30) Foreign Application Priority Data

Mar. 19, 2018    (KR) .................. 10-2018-0031343

(51) Int. Cl.
*H04N 19/51*    (2014.01)
*H04N 19/105*    (2014.01)
*H04N 19/176*    (2014.01)

(52) U.S. Cl.
CPC .......... *H04N 19/51* (2014.11); *H04N 19/105* (2014.11); *H04N 19/176* (2014.11)

(58) Field of Classification Search
CPC .... H04N 19/105; H04N 19/176; H04N 19/51; H04N 19/517; H04N 19/56; H04N 19/577

See application file for complete search history.

(56) References Cited

U.S. PATENT DOCUMENTS 7,099,392 B2    8/2006    Kim
8,446,524 B2    5/2013    Chen et al.
(Continued)

FOREIGN PATENT DOCUMENTS

CN          103299642 A      9/2013
KR    10-2017-0058866 A      5/2017
(Continued)

OTHER PUBLICATIONS

Chinese Office Action dated Mar. 23, 2023 in Chinese Application No. 201980019969.4.
(Continued)

*Primary Examiner* — Anner Holder
(74) *Attorney, Agent, or Firm* — Sughrue Mion, PLLC

(57) ABSTRACT

The present invention provides an image encoding method and an image decoding method. An image decoding method according to the present invention, for decoding an image by decoder-side motion information derivation, comprises the steps of: checking, from among a plurality of motion information derivation types, the motion information derivation type applied to the current block: and deriving motion information of the current block according to the checked motion information derivation type, wherein different motion information compensation techniques are applicable according to the motion information derivation type.

6 Claims, 17 Drawing Sheets

Related U.S. Application Data continuation of application No. 16/978,025, filed as application No. PCT/KR2019/003192 on Mar. 19, 2019, now Pat. No. 11,356,692.

(56) References Cited

U.S. PATENT DOCUMENTS

| | | |
|---|---|---|
| 9,137,546 B2 | 9/2015 | Won et al. |
| 10,575,011 B2 | 2/2020 | Park et al. |
| 2006/0245497 A1 | 11/2006 | Shoemaker |
| 2007/0206677 A1 | 9/2007 | Ding et al. |
| 2008/0159397 A1 | 7/2008 | Kawashima et al. |
| 2009/0103621 A1 | 4/2009 | Numata et al. |
| 2009/0285301 A1 | 11/2009 | Kurata |
| 2010/0194932 A1 | 8/2010 | Mitsuya et al. |
| 2010/0296581 A1 | 11/2010 | Metoevi et al. |
| 2013/0329007 A1 | 12/2013 | Zhang et al. |
| 2014/0226725 A1 | 8/2014 | Lin et al. |
| 2015/0078451 A1 | 3/2015 | Tourapis et al. |
| 2016/0286229 A1 | 9/2016 | Li et al. |
| 2016/0286230 A1 | 9/2016 | Li et al. |
| 2016/0366435 A1* | 12/2016 | Chien ................ H04N 19/51 |
| 2017/0208341 A1 | 7/2017 | Kulakov et al. |
| 2017/0272776 A1 | 9/2017 | Tourapis et al. |
| 2018/0249154 A1 | 8/2018 | Chuang et al. |
| 2018/0352247 A1 | 12/2018 | Park et al. |
| 2020/0077088 A1 | 3/2020 | Chuang et al. |
| 2020/0154135 A1* | 5/2020 | Lee .................. H04N 19/56 |
| 2021/0021847 A1 | 1/2021 | Moon et al. |
| 2022/0264141 A1* | 8/2022 | Seo .................. H04N 19/139 |

FOREIGN PATENT DOCUMENTS

| | | |
|---|---|---|
| KR | 10-2017-0131446 A | 11/2017 |
| KR | 10-2017-0131448 A | 11/2017 |
| WO | 2017/036414 A1 | 3/2017 |
| WO | 2017/052081 A1 | 3/2017 |

OTHER PUBLICATIONS

International Search Report for PCT/KR2019/003192, dated Jun. 25, 2019.

Chinese notice of Allowance dated Aug. 28, 2023 in Application No. 201980019969.4.

* cited by examiner

Fig. 9(a) Diamond search pattern

Fig. 9(b) Cross search pattern

| MV CANDIDATES – CU LEVEL | |
|---|---|
| 1 | AMVP candidates (if AMVP) — 1501 |
| 2 | MERGE candidates (w/o SUB-BLOCK LEVEL cand.) — 1502 |
| 3 | FRUC unilateral candidates — 1503 |
| 4 | Top and Left neighboring MVs — 1504 |

| MV CANDIDATES – SUB-BLOCK LEVEL | |
|---|---|
| 1 | Best candidate of the whole CU — 1511 |
| 2 | Top and Left neighboring MVs — 1512 |
| 3 | Top-left and Top-right MVs — 1513 |
| 4 | Scaled versions of co-located MVs — 1514 |
| 5 | ATMVP — 1515 |
| 6 | STMVP — 1516 |

| MV CANDIDATES – CU LEVEL | | |
|---|---|---|
| 1 | AMVP candidates (if AMVP) | 1501 |
| 2 | MERGE candidates (w/o SUB-BLOCK LEVEL cand.) | 1502 |
| 3 | FRUC unilateral candidates | 1503 |
| 4 | Top and Left neighboring MVs | 1504 |

1000a (b)

| MV CANDIDATES – SUB-BLOCK LEVEL | | |
|---|---|---|
| 1 | Best candidate of the whole CU | 1511 |
| 2 | Scaled versions of co-located MVs | 1514 |
| 3 | ATMVP | 1515 |
| 4 | STMVP | 1516 |

1010a

IMAGE DECODING METHOD/APPARATUS, IMAGE ENCODING METHOD/APPARATUS, AND RECORDING MEDIUM STORING BITSTREAM

CROSS REFERENCE TO RELATED APPLICATIONS

This is a continuation of U.S. application Ser. No. 17/736,324 filed May 4, 2022, which is a continuation of U.S. application Ser. No. 16/978,025 filed Sep. 3, 2020, which is a National Stage of International Application No. PCT/KR2019/003192 filed Mar. 19, 2019, claiming priority based on Korean Patent Application No. 10-2018-0031343 filed Mar. 19, 2018, of which the disclosure is incorporated herein in its entirety.

TECHNICAL FIELD

The present invention relates to an image encoding/decoding method and apparatus. More specifically, the present invention relates to an image decoding method/apparatus using motion derivation of a decoder side, and an image encoding method/apparatus corresponding thereto.

BACKGROUND ART

The market demands for high resolution video is increasing, and accordingly, a technology capable of efficiently compressing high resolution video is required. According to these market demands, ISO/IEC's Moving Picture Expert Group (MPEG) and ITU-T's Video Coding Expert Group (VCEG) jointly formed JCT-VC (Joint Collaborative Team on Video Coding), completed the development of the HEVC (High Efficiency Video Coding) video compression standard in January 2013, and has been actively researching and developing next-generation compression standards.

Video compression is largely composed of intra prediction, inter prediction, transform, quantization, entropy coding, and in-loop filter. Meanwhile, as the demand for high-resolution video increases, the demand for stereoscopic video content as a new video service also increases. Discussion of video compression technology for effectively providing high-resolution and ultra-high-resolution stereoscopic image content is ongoing.

In relation to this, for inter prediction, generating motion information for each current block and signaling all generated motion information may cause a problem of deteriorating efficiency in terms of encoding or encoder.

DISCLOSURE

Technical Problem

An object of the present invention is to provide an image encoding/decoding method and apparatus with improved efficiency. In particular, an object of the present invention is to provide an image decoding method and apparatus to which motion information derivation of a decoder side is applied. In addition, an object of the present invention is to provide an image encoding method and apparatus applied to which motion information derivation of a decoder side is applied.

In addition, an object of the present invention is to provide an image decoding method and apparatus using different motion information correction methods according to a target motion information derivation method in deriving motion information using one or more motion information derivation methods in the decoder side.

In addition, an object of the present invention is to provide an image decoding method and apparatus including a method of early termination of a motion information derivation process when a specific condition is satisfied in deriving motion information using one or more motion information derivation methods in the decoder side.

In addition, an object of the present invention is to provide an image decoding method and apparatus using subsampled block matching in deriving motion information using one or more motion information derivation methods in the decoder side.

In addition, an object of the present invention is to provide an image encoding method and apparatus of signaling and providing related information in order to derive motion information using one or more motion information derivation methods in the decoder side.

Another object of the present invention is to provide a computer-readable recording medium storing a bitstream generated by the video encoding method/apparatus.

Technical Solution

The video encoding/decoding method and apparatus according to the present invention may determine a search area for improving motion information of a current block, generate a SAD list for the search area, derive delta motion information of the current block based on a SAD candidate of the SAD list, and update motion information of the current block using the motion information of the current block and the delta motion information.

In the video encoding/decoding method and apparatus according to the present invention, the SAD list may include a plurality of SAD candidates.

In the image encoding/decoding method and apparatus according to the present invention, the search area is determined as an area including at least one of a reference block or an adjacent area of the reference block, and the adjacent area may be an area extended by N sample lines from a boundary of the reference block.

In the video encoding/decoding method and apparatus according to the present invention, the SAD candidate may be determined by the SAD value between the L0 block and the L1 block. The L0 block may be determined based on a position of the L0 reference block of the current block and a predetermined offset. The L1 block may be determined based on the position of the L1 reference block of the current block and the predetermined offset.

In the image encoding/decoding method and apparatus according to the present invention, the offset may include at least one of a non-directional offset or a directional offset. The directional offset may include an offset for at least one direction of left, right, top, bottom, top-left, top-right, bottom-left or bottom-right.

In the image encoding/decoding method and apparatus according to the present invention, the step of deriving the delta motion information may be performed based on a comparison result between a reference SAD candidate and a predetermined threshold, and the reference SAD candidate may mean the SAD candidate corresponding to the non-directional offset.

In the image encoding/decoding method and apparatus according to the present invention, when the reference SAD candidate is greater than or equal to the threshold, the step of deriving the delta motion information may comprise: identifying a SAD candidate having a minimum value among SAD candidates belonging to the SAD list; and determining delta motion information based on the offset corresponding to the identified SAD candidate.

In the image encoding/decoding method and apparatus according to the present invention, when the reference SAD candidate is less than the threshold, the step of deriving the delta motion information may comprise calculating a predetermined parameter using all or part of the SAD candidates belonging to the SAD list; and determining the delta motion information based on the calculated parameter.

In the image encoding/decoding method and apparatus according to the present invention, updating of motion information of the current block may be performed limitedly by considering at least one of a block size, a distance between a current picture and a reference picture, an inter prediction mode, a prediction direction, or a unit/resolution of motion information.

Advantageous Effects

According to the present invention, an image encoding/decoding method and apparatus with improved efficiency as described below may be provided.

First, according to the present invention, as the decoder derives motion information using one or more motion information derivation methods, an image decoding method and apparatus for improving encoding efficiency may be provided.

Second, according to the present invention, when one or more motion information derivation methods are used in the decoder side, an image decoding method and apparatus for improving decoding efficiency may be provided by using different motion information correction methods according to the motion information derivation method.

Third, according to the present invention, when one or more motion information derivation methods are used in the decoder side, an image decoding method and apparatus for improving decoding efficiency are provided by using a method of early termination of a motion information derivation process when a specific condition is satisfied.

Further, according to the present invention, a computer readable recording medium storing a bitstream generated by the video encoding method/apparatus according to the present invention may be provided.

DESCRIPTION OF DRAWINGS

FIGS. 15(a) and 15(b) illustrate an example of constructing a motion candidate list for initial search location selection in order to derive motion information in a decoder side.

FIG. 17 illustrates, for example, a modified motion candidate list applied to sub-block parallel processing.

BEST MODE

Figure 1:
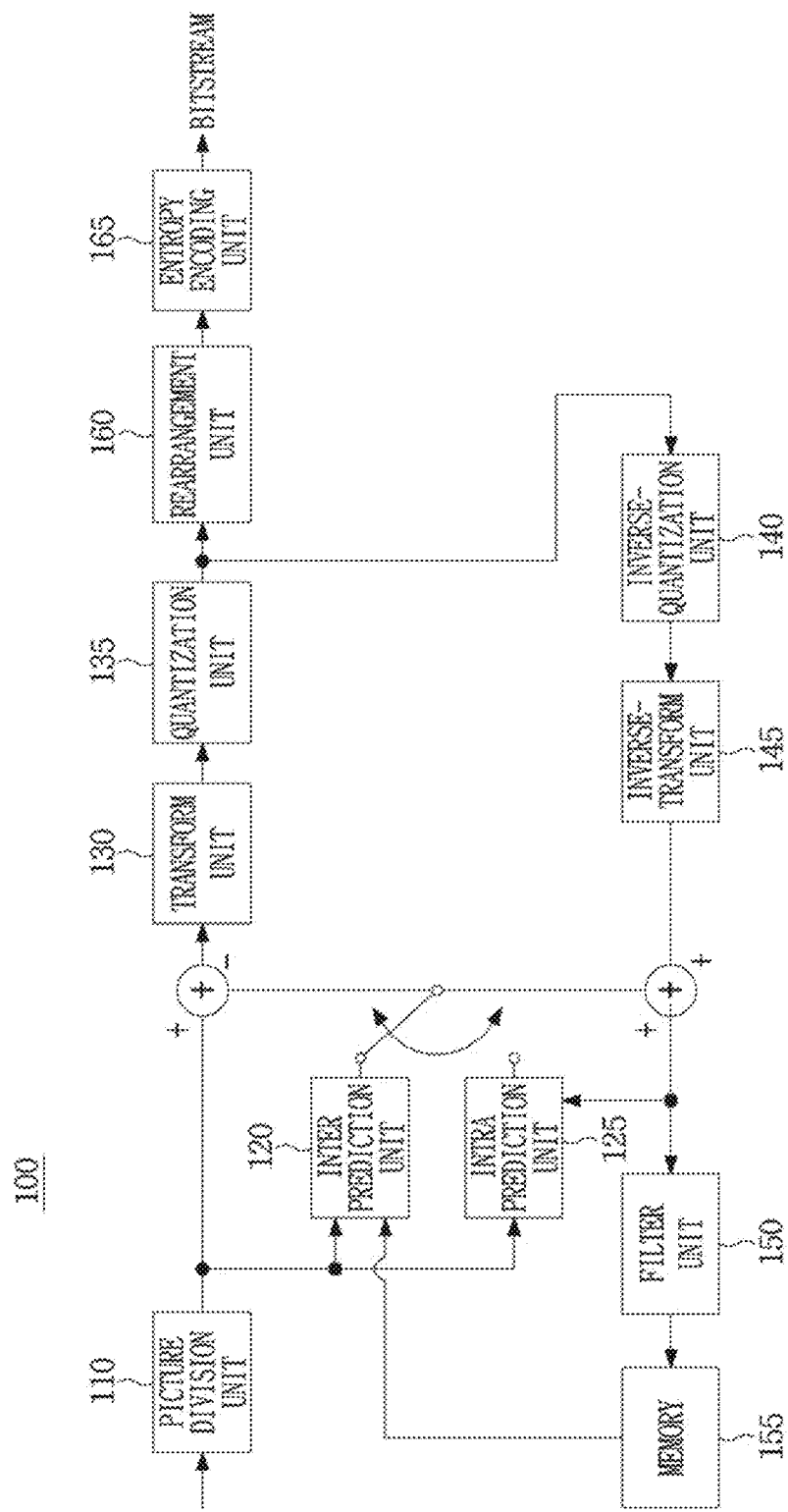
FIG. 1 is a block diagram showing an image encoding apparatus according to the present invention.

The video encoding/decoding method and apparatus according to the present invention may determine a search area for improving motion information of a current block, generate a SAD list for the search area, derive delta motion information of the current block based on a SAD candidate of the SAD list, and update motion information of the current block using the motion information of the current block and the delta motion information.

In the video encoding/decoding method and apparatus according to the present invention, the SAD list may include a plurality of SAD candidates.

In the image encoding/decoding method and apparatus according to the present invention, the search area is determined as an area including at least one of a reference block or an adjacent area of the reference block, and the adjacent area may be an area extended by N sample lines from a boundary of the reference block.

In the video encoding/decoding method and apparatus according to the present invention, the SAD candidate may be determined by the SAD value between the L0 block and the L1 block. The L0 block may be determined based on a position of the L0 reference block of the current block and a predetermined offset. The L1 block may be determined based on the position of the L1 reference block of the current block and the predetermined offset.

In the image encoding/decoding method and apparatus according to the present invention, the offset may include at least one of a non-directional offset or a directional offset. The directional offset may include an offset for at least one direction of left, right, top, bottom, top-left, top-right, bottom-left or bottom-right.

In the image encoding/decoding method and apparatus according to the present invention, the step of deriving the delta motion information may be performed based on a comparison result between a reference SAD candidate and a predetermined threshold, and the reference SAD candidate may mean the SAD candidate corresponding to the non-directional offset.

In the image encoding/decoding method and apparatus according to the present invention, when the reference SAD candidate is greater than or equal to the threshold, the step of deriving the delta motion information may comprise:

identifying a SAD candidate having a minimum value among SAD candidates belonging to the SAD list; and determining delta motion information based on the offset corresponding to the identified SAD candidate.

In the image encoding/decoding method and apparatus according to the present invention, when the reference SAD candidate is less than the threshold, the step of deriving the delta motion information may comprise calculating a predetermined parameter using all or part of the SAD candidates belonging to the SAD list; and determining the delta motion information based on the calculated parameter.

In the image encoding/decoding method and apparatus according to the present invention, updating of motion information of the current block may be performed limitedly by considering at least one of a block size, a distance between a current picture and a reference picture, an inter prediction mode, a prediction direction, or a unit/resolution of motion information.

MODE FOR INVENTION

Hereinafter, embodiments of the present invention will be described in detail with reference to the drawings attached thereto, so that those skilled in the art may easily carry out the present invention. The present invention may, however, be embodied in many different forms and should not be construed as limited to the embodiments set forth herein. In order to clearly illustrate the present invention, parts not related to the description are omitted, and similar parts are denoted by like reference characters throughout the specification.

Throughout this specification, when a part is referred to as being 'connected' to another part, it includes not only an example where they are directly connected but also an example where the part is electrically connected with another part in between.

In addition, when a part is referred to as 'comprising' an element throughout the specification, it is understood that the element may include other elements as well, without departing from the other elements unless specifically stated otherwise.

In addition, the terms first, second, etc. may be used to describe various components, but the components should not be limited by the terms. The terms are used only for the purpose of distinguishing one component from another.

In addition, in the embodiments of the apparatus and method described herein, some of the components of the apparatus or some of the steps of the method may be omitted. In addition, the order of some of the components of the apparatus or the order of some of the steps of the method may be changed. In addition, other components or other steps may be inserted in some of the components of the apparatus or in some of the steps of the method.

In addition, some of the components or steps of the first embodiment of the present invention may be added to the second embodiment of the present invention, or may replace some of the components or steps of the second embodiment.

In addition, the components shown in the embodiments of the present invention are shown independently to indicate different characteristic functions, and do not mean that each component is composed of separate hardware or one software component unit. That is, for convenience of description, each component is listed as each component, and at least two components of each component may be combined to form one component, or one component may be divided into a plurality of components to perform a function. The integrated and separated embodiments of each of these components are also included in the scope of the present invention without departing from the essence of the present invention.

First, the terms used in the present application will be briefly described as follows.

The decoding apparatus (Video Decoding Apparatus), which will be described later, may be a civil security camera, a civil security system, a military security camera, a military security system, a personal computer (PC), a notebook computer, a portable multimedia player (PMP), a wireless communication terminal, a smart phone, a apparatus included in a server terminal such as a TV application server and a service server, and may mean a user terminal such as various apparatus, a communication apparatus such as a communication modem for performing communication with a wired/wireless communication network, a memory for storing various programs and data for decoding an image or performing an inter prediction or intra prediction for decoding, various apparatus equipped with microprocessor, etc. for executing programs and calculating and controlling them.

In addition, an image encoded as a bitstream by an encoder may be transmitted to an image decoding apparatus through real-time or non-real-time wired/wireless communication networks such as the Internet, local area wireless communication networks, wireless LAN networks, WiBro networks, mobile communication networks, or through various communication interfaces such as cables, Universal Serial Bus (USB), etc., decoded, reconstructed as an image, and reproduced. Alternatively, the bitstream generated by the encoder may be stored in memory. The memory may include both volatile memory and non-volatile memory. In the present specification, the memory may be represented as a recording medium storing the bitstream.

In general, a video may be composed of a series of pictures, and each picture may be divided into a coding unit such as a block. In addition, a person with ordinary knowledge in the technical field to which this embodiment belongs may understand that the term 'a picture' described below may be used by replacing it with another term having an equivalent meaning such as 'an image' or 'a frame'. In addition, it will be understood by those of ordinary skill in the art to which this embodiment pertains that the term 'a coding unit' may be substituted for and used with other terms having the same meaning, such as 'a unit block 'and 'a block'.

Hereinafter, exemplary embodiments of the present invention will be described in detail with reference to the accompanying drawings. In describing the present invention, redundant description of the same components will be omitted.

FIG. 1 is a block diagram showing an image encoding apparatus according to the present invention. Referring to FIG. 1, the conventional image encoding apparatus 100 includes a picture division unit 110, a prediction unit 120, 125, a transform unit 130, a quantization unit 135, a rearrangement unit 160, and an entropy encoding unit 165, an inverse quantization unit 140, an inverse transform unit 145, a filter unit 150, and a memory 155.

The picture division unit 110 may divide the input picture into at least one processing unit. In this case, the processing unit may be a prediction unit (PU), a transform unit (TU), or a coding unit (CU). Hereinafter, in an embodiment of the present invention, a coding unit may be used as a meaning of a unit that performs encoding, or may be used as a meaning of a unit that performs decoding.

The prediction unit may be obtained by dividing one coding unit into at least one square or non-square shape of the same size. One coding unit may be divided such that one prediction unit of prediction units has a different shape and/or size from another prediction unit. When a prediction unit that performs intra prediction based on a coding unit is not a minimum coding unit, intra prediction may be performed without dividing into a plurality of N×N prediction units.

The prediction units 120 and 125 may include an inter prediction unit 120 that performs inter prediction, and an intra prediction unit 125 that performs intra prediction. Whether to use inter prediction or intra prediction for a prediction unit may be determined, and specific information (e.g., intra prediction mode, motion vector, reference picture, etc.) according to each prediction method may be determined. The residual value (residual block) between the generated prediction block and the original block may be input to the transform unit 130. In addition, prediction mode information, motion vector information, and the like used for prediction may be encoded by the entropy encoding unit 165 together with the residual value and transmitted to the decoder. However, when the motion information derivation method of the decoder side according to the present invention is applied, the corresponding information is not transmitted to the decoder because the prediction mode information, motion vector information, and the like are not generated in the encoder. On the other hand, information indicating that the motion information is derived and used in the decoder side and information on a method used to derive the motion information may be signaled from the encoder.

The inter prediction unit 120 may predict a prediction unit based on information of at least one of a previous picture or a subsequent picture of the current picture, and in some cases, predict a prediction unit based on information of some regions, which encoding has been completed, in the current picture. The inter prediction unit 120 may include a reference picture interpolation unit, a motion prediction unit, and a motion compensation unit.

The reference picture interpolation unit may receive reference picture information from the memory 155 and generate pixel information of an integer pixel or less in the reference picture. In the case of a luma pixel, a DCT-based 8-tap interpolation filter (DCT-based interpolation filter) having different filter coefficients may be used to generate pixel information of an integer pixel or less in units of a ¼ pixels. In case of a chroma signal, a DCT-based 4-tap interpolation filter (DCT-based interpolation filter) having different filter coefficients may be used to generate pixel information of an integer pixel or less in units of ⅛ pixels.

The motion prediction unit may perform motion prediction based on the reference picture interpolated by the reference picture interpolation unit. As a method for calculating the motion vector, various methods such as Full Search-based Block Matching Algorithm (FBMA), Three Step Search (TSS), and New Three-Step Search Algorithm (NTS) may be used. The motion vector may have a motion vector value in units of ½ or ¼ pixels based on the interpolated pixels. The motion prediction unit may predict a current prediction unit by differently using a motion prediction method. Various methods such as a skip method, a merge method, an AMVP (Advanced Motion Vector Prediction) method, and an intra block copy method may be used as the motion prediction method. In addition, when applying the motion information derivation method of the decoder side according to the present invention, a template matching method and a bidirectional matching (bilateral matching) method using a motion trajectory may be applied as methods performed by the motion prediction unit. In relation, the template matching method and the bidirectional matching method will be described later in detail in FIG. 3.

The intra prediction unit 125 may generate a prediction unit based on reference pixel information around a current block, which is pixel information in a current picture. When the neighboring block of the current prediction unit is a block that performs inter prediction and the reference pixel is a pixel that performs inter prediction, the reference pixel included in the block that performs inter prediction may be used by replacing it with reference pixel information of a block that performs intra prediction around it. That is, when the reference pixel is not available, the unavailable reference pixel information may be used by replacing with at least one reference pixel among the available reference pixels.

In addition, a residual block including residual information that is a difference value between the prediction unit that performs prediction based on the prediction units generated by the prediction units 120 and 125 and the original block of the prediction unit may be generated. The generated residual block may be input to the transform unit 130.

The transform unit 130 may transform a residual block including residual information between a prediction unit generated by the prediction units 120 and 125 and the original block by using the transform method such as DCT (Discrete Cosine Transform), DST (Discrete Sine Transform), and KLT. Whether DCT, DST, or KLT is applied to transform the residual block may be determined based on intra prediction mode information of a prediction unit used to generate the residual block.

The quantization unit 135 may quantize values transformed to the frequency domain by the transform unit 130. The quantization coefficient may vary depending on the block or the importance of the image. The value calculated by the quantization unit 135 may be provided to the inverse quantization unit 140 and the rearrangement unit 160.

The rearrangement unit 160 may perform the rearrangement of the coefficient value for the quantized residual value.

The rearrangement unit 160 may change coefficients of 2-dimensional block form into 1-dimensional vector form through a coefficient scanning method. For example, the rearrangement unit 160 may change into a 1-dimensional vector form by scanning from a DC coefficient to a coefficient in a high frequency region according to a Zig-Zag Scan method. Depending on the size of the transform unit and the intra prediction mode, a vertical scan of scanning coefficients of two-dimensional block form in a column direction and a horizontal scan of scanning coefficients of two-dimensional block form in a row direction may be used instead of a zig-zag scan. That is, depending on the size of the transform unit and the intra prediction mode, it may be determined which one of a zigzag scan, a vertical scan, and a horizontal scan is used.

The entropy encoding unit 165 may perform entropy-encoding based on values calculated by the rearrangement unit 160. Various encoding methods, such as exponential Golomb, CAVLC (Context-Adaptive Variable Length Coding), and CABAC (Context-Adaptive Binary Arithmetic Coding), may be used for entropy-encoding. In relation to this, the entropy encoding unit 165 may encode residual value coefficient information of a coding unit from the rearrangement unit 160 and the prediction units 120 and 125. In addition, according to the present invention, information indicating that the motion information is derived and used in the decoder side and information on a method used to derive the motion information may be signaled from the encoder.

The inverse quantization unit 140 and the inverse transform unit 145 inverse-quantize the values quantized by the quantization unit 135 and inverse-transform the values transformed by the transform unit 130. The reconstructed block may be generated by combining the residual value generated by the inverse quantization unit 140 and the inverse transform unit 145 with the prediction unit predicted through the motion estimation unit, the motion compensation unit, and the intra prediction unit included in the prediction units 120 and 125.

The filter unit 150 may include at least one of a deblocking filter, an offset correction unit, and an adaptive loop filter (ALF). The deblocking filter may remove block distortion caused by boundary between blocks in the reconstructed picture. The offset correction unit may correct an offset from the original image in units of pixels for the deblocking-filtered image. In order to perform offset correction for a specific picture, after classifying the pixels included in the image into a certain number of regions and determining the region to which the offset is applied, a method of applying the offset to the region offset or a method of applying the offset by considering edge information of each pixel may be used. ALF (Adaptive Loop Filtering) may be performed based on a value obtained by comparing a filtered reconstructed image with an original image. After classifying the pixels included in the image into a predetermined group, one filter to be applied to the group may be determined to perform filtering differently for each group.

The memory 155 may store the reconstructed block or picture output from the filter unit 150, and the stored reconstructed block or picture may be provided to the prediction units 120 and 125 when performing inter prediction.

Figure 2:
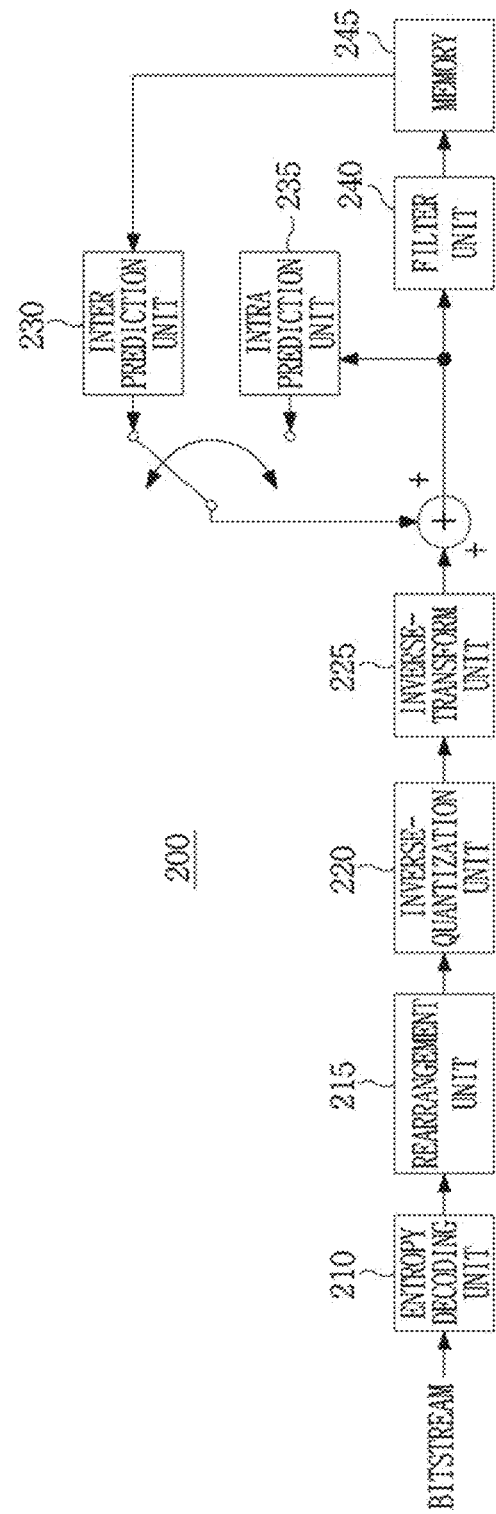
FIG. 2 is a block diagram showing an image decoding apparatus according to the present invention.

FIG. 2 is a block diagram showing an image decoding apparatus according to the present invention. Referring to FIG. 2, the image decoder 200 may include an entropy decoding unit 210, a rearrangement unit 215, an inverse quantization unit 220, an inverse transform unit 225, a prediction unit 230, 235, and a filter unit 240, a memory 245.

When an image bitstream is input from the image encoder, the input bitstream may be decoded in a procedure opposite to that of the image encoder.

The entropy decoding unit 210 may perform entropy-decoding in a procedure opposite to that performed by entropy-encoding in the entropy encoding unit of the image encoder. For example, various methods corresponding to the method performed in the image encoder such as Exponential Golomb (CAVLC), Context-Adaptive Variable Length Coding (CAVLC), and Context-Adaptive Binary Arithmetic Coding (CABAC) may be applied.

The entropy decoding unit 210 may decode information related to intra prediction and inter prediction performed by the encoder.

The rearrangement unit 215 may perform rearrangement of the bitstream entropy-decoded by the entropy decoding unit 210 based on a rearrangement method of the encoding unit. The coefficients of a 1-dimensional vector form may be rearranged into coefficients of a 2-dimensional block form again.

The inverse quantization unit 220 may perform inverse quantization based on the quantization parameter provided by the encoder and the coefficients of the rearranged block.

The inverse transform unit 225 may perform inverse transform, that is, inverse DCT, inverse DST, and inverse KLT, corresponding to transforms performed by the transform unit, that is, DCT, DST, and KLT for the quantization results performed by the image encoder. The inverse transform may be performed based on the transmission unit determined by the image encoder. In the inverse transform unit 225 of the image decoder, a transform method (for example, DCT, DST, KLT) may be selectively performed according to a plurality of information such as a prediction method, a size of a current block, and a prediction direction.

The prediction units 230 and 235 may generate a prediction block based on prediction block generation related information provided by the entropy decoding unit 210 and previously decoded block or picture information provided by the memory 245.

As described above, when a size of the prediction unit and a size of the transform unit are the same in performing intra prediction in the same manner as in the image encoder, the intra prediction of the prediction unit may be performed based on pixels located on the left, the top-left and the top of the prediction unit. However, when the size of the prediction unit and the size of the transform unit are different in performing intra prediction, the intra prediction may be performed using a reference pixel based on the transform unit. In addition, the intra prediction using N×N division may be used only for the minimum coding unit.

The prediction units 230 and 235 may include a prediction unit determination unit, an inter prediction unit, and an intra prediction unit. The prediction unit determination unit may receive various information from the entropy decoding unit 210 such as prediction unit information, prediction mode information of an intra prediction method, and motion prediction related information of an inter prediction method, classify the prediction unit from the current coding unit, and determine whether the prediction unit performs inter prediction or intra prediction. On the other hand, if the motion prediction related information for the inter prediction is not transmitted, and instead, information indicating that the motion information is derived and used in the decoder side and information about a method used to derive the motion information is transmitted from the encoder 100, the prediction unit determination unit determines the prediction performance of the inter prediction unit 23 based on the information transmitted from the encoder 100.

The inter prediction unit 230 may perform inter prediction for a current prediction unit based on information included in at least one of a previous picture or a subsequent picture of the current picture including the current prediction unit, by using information required for inter prediction of the current prediction unit provided by the image encoder. In order to perform inter prediction, a motion prediction method of a prediction unit included in a coding unit may be determined among a skip mode, a merge mode, an AMVP mode, and an intra block copy mode. Alternatively, the inter prediction unit 230 may perform inter prediction by deriving motion information from information indicating that the motion information is derived and used in the decoder side and information on a method used to derive the motion information, provided by the image encoder.

The intra prediction unit 235 may generate a prediction block based on pixel information in the current picture. When the prediction unit is a prediction unit that has performed intra prediction, intra prediction may be performed based on intra prediction mode information of a prediction unit provided by an image encoder. The intra prediction unit 235 may include an adaptive intra smoothing (AIS) filter, a reference pixel interpolation unit, and a DC filter. The AIS filter is a part that performs filtering on the reference pixel of the current block and may be applied by determining whether to apply the filter according to the prediction mode of the current prediction unit. AIS filtering may be performed on a reference pixel of a current block by using prediction mode and AIS filter information of a prediction unit provided by an image encoder. When the prediction mode of the current block is a mode that does not perform AIS filtering, the AIS filter may not be applied.

When the prediction mode of the prediction unit is the prediction unit that performs intra prediction based on the pixel value obtained by interpolating the reference pixel, the reference pixel interpolation unit may interpolate the reference pixel to generate a reference pixel of an integer pixel or less. When the prediction mode of the current prediction unit is a prediction mode in which a prediction block is generated without interpolating a reference pixel, the reference pixel may not be interpolated. The DC filter may generate a prediction block through filtering when the prediction mode of the current block is the DC mode.

The reconstructed block or picture may be provided to the filter unit 240. The filter unit 240 may include a deblocking filter, an offset correction unit, and an ALF.

Information about whether a deblocking filter is applied to a corresponding block or picture and information about whether a strong filter is applied or a weak filter is applied in applying the deblocking filter may be provided from a video encoder. In the deblocking filter of the video decoder, information related to the deblocking filter provided by the video encoder may be provided, and the video decoder may perform deblocking filtering on the corresponding block.

The offset correction unit may perform offset correction on the reconstructed image based on a type of offset correction and offset value information applied to the image during encoding. ALF may be applied to a coding unit based on information on whether to apply ALF, ALF coefficient information, and the like, provided by an encoder. This ALF information may be provided from a specific parameter set.

The memory 245 may store the reconstructed picture or block so that it can be used as a reference picture or a reference block, and may also provide the reconstructed picture to an output unit.

Figure 3:
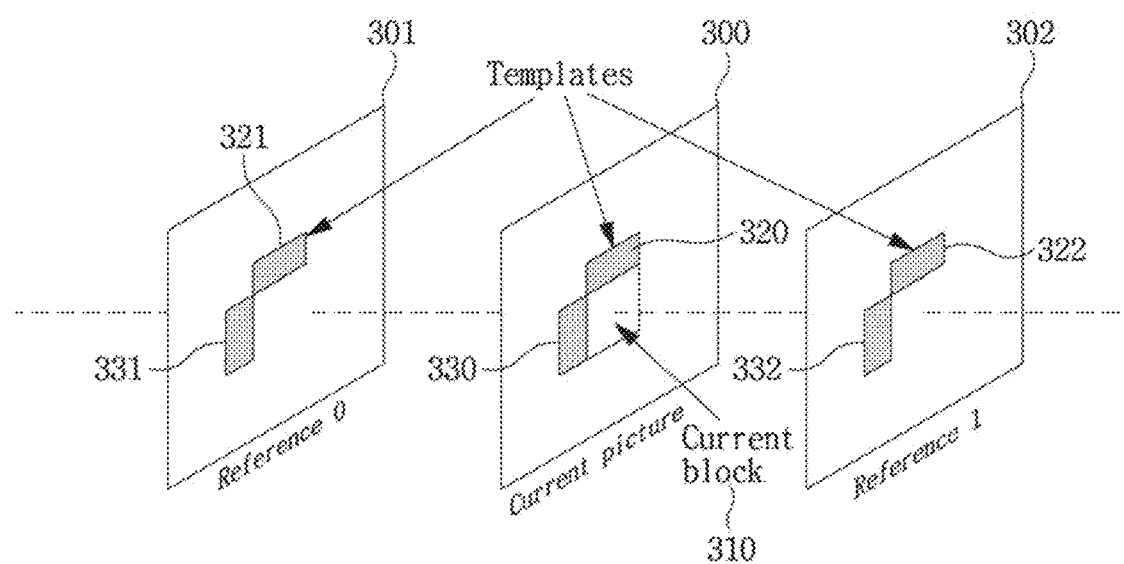
FIG. 3 illustrates a concept of a motion information derivation method using template matching, as one of methods for deriving motion information in a decoder side according to the present invention.

FIG. 3 illustrates a concept of a motion information derivation method using template matching, as one of methods for deriving motion information in a decoder side according to the present invention. That is, the inter prediction unit 120 in the encoder 100 and the inter prediction unit 230 in the decoder 200 perform motion information derivation method using template matching in the same manner, which will be described later. Accordingly, the encoder 100 does not transmit prediction-related motion information and a residual signal generated during encoding, or even transmits only a residual signal, the decoder 200 itself may derive motion information using a template matching method, and then reconstruct the same. Hereinafter, a method for deriving motion information using template matching will be described in detail.

Referring to FIG. 3, deriving motion information using template matching (hereinafter also referred to as 'TM') refers to a method of deriving motion information based on a pixel similarity between a plurality of pixels spatially adjacent to the current target block 310 in the current encoding and decoding target picture 300 and pixels of the same shape located in reference pictures 301 and 302. Here, a plurality of pixels spatially adjacent to the current target block 300 and pixels of the same shape located in the reference pictures 301 and 302 are referred to as a template.

Accordingly, the shape of the template may be a predetermined form or may be transmitted through a high level syntax.

One or more templates may be configured for the current target block 300, and as illustrated in FIG. 3, a template 130 adjacent to the top and a template 330 adjacent to the left may be used, respectively. In addition, each template may be configured with a template of the same shape and size in the reference picture. The template configured in the reference picture may be composed of the top templates 321 and 322 corresponding to the template 320 adjacent to the top of the current target block 300 and the left template (331, 332) corresponding to the template 330 adjacent to the left of the current target block 300.

Here, whether the top and left neighboring pixels are configurable is checked, and the template is configured only when the template can be configured using the top and left neighboring pixels. Template matching may be performed by using some templates other than the template that is not configurable among the predefined one or more templates.

In relation, a case where the template is not configurable may be a case where the current target block is located at a picture, tile, and slice boundary.

Figure 4:
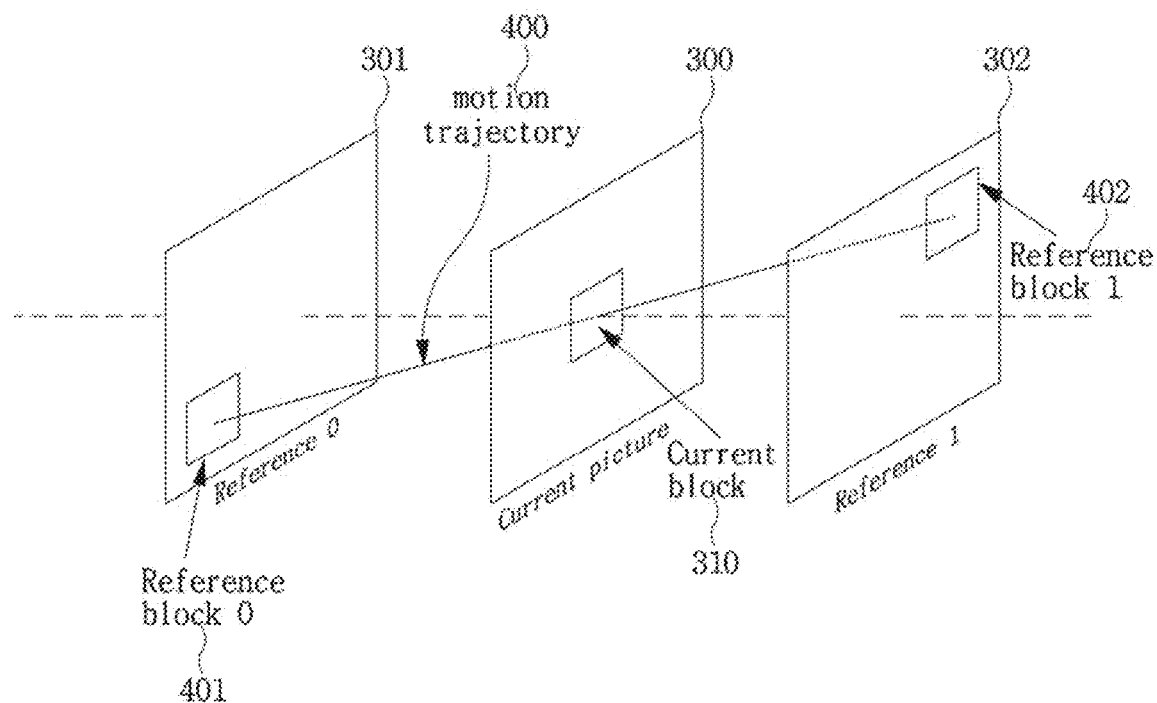
FIG. 4 is a diagram illustrating a concept of a motion information derivation method using bidirectional matching as one of methods for deriving motion information in a decoder side according to the present invention.

FIG. 4 is a diagram illustrating a concept of a motion information derivation method using bidirectional matching as one of methods for deriving motion information in a decoder side according to the present invention. That is, the inter prediction unit 120 in the encoder 100 and the inter prediction unit 230 in the decoder 200 perform the same motion information derivation method using bidirectional matching. Therefore, the encoder 100 does not transmit prediction-related motion information and a residual signal generated during encoding, or even transmits only a residual signal, the decoder 200 itself derive motion information using a bidirectional matching method, and then reconstruct the same. Hereinafter, a method for deriving motion information using bidirectional matching will be described in detail.

Referring to FIG. 4, deriving motion information using bidirectional matching (hereinafter also referred to as 'BM') refers to a method of deriving motion information based on a pixel similarity between two different reference blocks (401, 402) located in reference pictures (301, 302) which are located in both directions of a current target block 310 in a current picture to be encoded and decoded 300.

Here, the two different reference blocks 401 and 402 located in the reference pictures 301 and 302 which are located in both directions of the current target block 310 are selected using one motion trajectory (400).

Referring to FIG. 4, according to an embodiment of the present invention, two different reference pictures 301 and 302 centered on the current target block 310 may be connected by using one motion trajectory 400. In addition, reference blocks 401 and 402 having the same size and shape corresponding to the current target block 310 may be configured at the connected location.

The bidirectional matching method according to an embodiment of the present invention comprises a process of configuring reference blocks 401 and 402 of the same size and shape corresponding to the current target block 310, and obtaining one motion trajectory (400) that minimizes the error between pixels in the two reference blocks 401 and 402.

Figure 5:
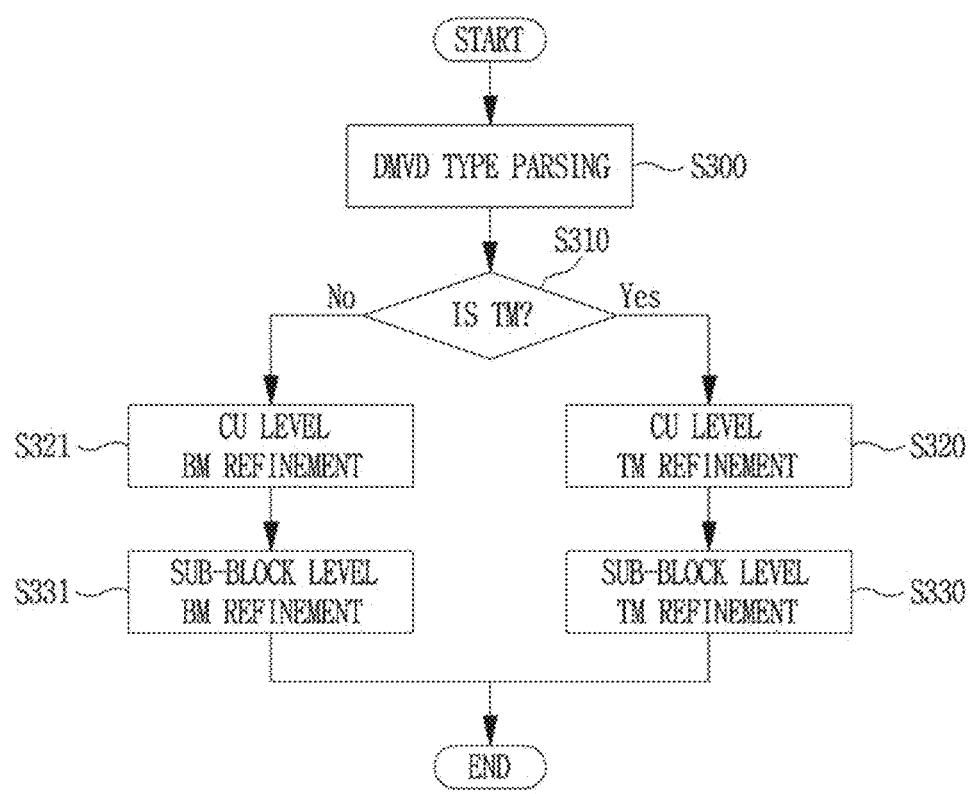
FIG. 5 is an example of a flowchart of a decoding method according to an embodiment of the present invention.

FIG. 5 is an example of a flowchart of a decoding method according to an embodiment of the present invention. In particular, it relates to a flowchart of decoding when a mode of deriving motion information of the decoder side is selected.

In the present invention, a case in which one or more motion information derivation methods are used to derive motion information of the decoder side will be described as an embodiment. Examples of the one or more motion information derivation methods include a template matching (TM) method and a bidirectional matching (BM) method.

Specifically, when a mode using a decoder-side motion vector derivation (DMVD) method is selected for the current target block, motion information of the current target block and sub-blocks resulting from dividing the current target block is directly derived in the decoder side by deriving and modifying motion information according to one or more coding units, without signaling information.

Referring to FIG. 5, it is assumed that a mode using a decoder-side motion vector derivation (DMVD) method is selected for the current target block according to an embodiment of the present invention (S300). Here, determining whether a template matching is used based on information indicating one of multiple decoder-side motion information derivation methods (S310) is included. In step S310, when the current target block uses a template matching (TM), deriving motion information using a template matching method in units of CUs and modifying it (S320); and additionally modifying motion information using a template matching method in units of sub-blocks (S330) are included. In addition, when the current target block uses bidirectional matching (BM) in step S310, deriving motion information using a bidirectional matching method in units of CUs and modifying it (S321), and additionally modifying motion information using a bidirectional matching method in units of sub-blocks (S331) are included.

Here, CU represents a coding unit and means a coding unit in the encoding and decoding steps. In addition, the sub-block is one of a plurality of sub-blocks resulting from dividing the CU.

The result obtained in the steps (S320, S321) of deriving motion information in units of CUs is CU unit-based optimal motion information for the current encoding target block, and CU unit-based optimal motion information may be used as an initial value for modification in the steps (S330, S331) of additionally modifying motion information in units of sub-blocks.

Figure 6:
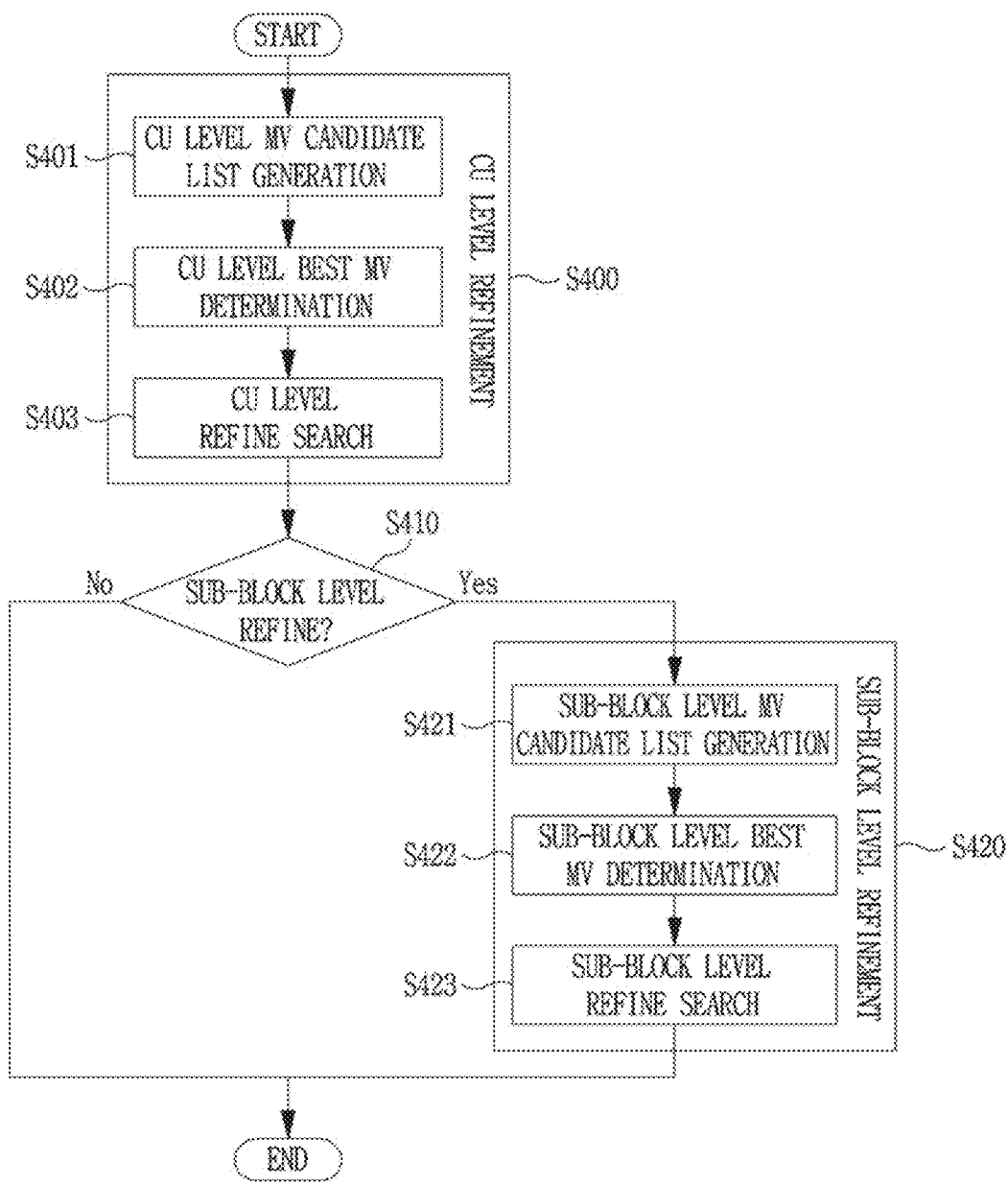
FIGS. 6 and 7 illustrate another flowchart of a decoding method according to an embodiment of the present invention.

FIG. 6 illustrates another flowchart of a decoding method according to an embodiment of the present invention. In particular, a method of performing decoding when a mode for deriving motion information in the decoder side is selected for the current block is illustrated in more detail.

In case that a mode for deriving motion information in the decoder side, proposed by the present invention, is selected, largely two steps of motion information derivation process is performed. Since the motion information derivation process is performed in the same manner in the encoder and decoder, motion may be derived without information transmitted from the encoder to the decoder.

As illustrated in FIGS. 5 and 6, the process of deriving motion information in the decoder side proposed by the present invention may be classified into a CU unit improvement step (S400) and a sub-block unit improvement step (S420).

The CU unit improvement step (S400) and the sub-block unit improvement step (S420) may be sequentially performed, but it is also possible to independently perform only the CU unit improvement step (S400) according to the result of determining whether to perform the sub-block unit improvement step (S420) (S410).

The process included in the CU unit improvement step (S400) and the sub-block unit improvement step (S420) is equally applied to the above-described template matching method and the bidirectional matching method, but in the search and determination steps, the matching method to determine pixel similarity is applied differently.

Specifically, the CU unit improvement step (S400) includes a CU unit motion candidate list generation step (S401), a CU unit optimal motion determination step (S402), and a CU unit improvement search step (S403).

The CU unit motion candidate list generation step (S401) is a step of generating a motion candidate list required for initial search location selection in order to perform motion derivation on the decoder side of a CU unit. Here, motion candidates to be added to the motion candidate list may be predefined and added in the same order in the encoder and decoder. In relation to this, a method of constructing a CU unit motion candidate list will be described later in detail with reference to FIGS. 15(a) and 15(b).

In the CU unit optimal motion determination step (S402) is a step of selecting one best motion candidate having a minimum cost among a plurality of motion candidates by searching sequentially the motion candidates added to the motion candidate list generated in the CU unit motion candidate list generation step (S401).

In this regard, a sum of absolute difference (SAD) for determining similarity between pixels included in a block may be used as a cost used to determine the optimal motion candidate. However, in addition to SAD, SATD (Sum of absolute transformed difference), SSE (Sum of square error), etc. may be used in various ways. A rate-distortion value (RD-cost) may be used by considering a value for bit rate together with similarity between pixels.

The CU unit improvement search step (S403) is a step of finally determining the CU unit optimal motion by performing additional search using the optimal motion information determined in the CU unit optimal motion determination step (S402) as a starting position.

Various search methods may be used as a motion search methods for determining the optimal motion of a CU unit in the CU unit improvement search step (S403). As an example of the motion search methods, a square search, a Hexagon search, a diamond search, a cross search, and an adaptive cross search may be used.

According to an embodiment of the present invention, one or more different motion search methods may be sequentially performed in the CU unit improvement search step (S403). When a search position is not changed in a process of performing the first search process with an initial diamond search, a secondary search process may be performed by applying a cross search method that searches for four pixel positions of a corresponding position, top, bottom, left, and right. This will be described later in detail in FIGS. 9(a) and 9(b).

In relation to this, the meaning that the search position is not changed in the search process means a case in which a search value of an initial position of each search step among a plurality of search positions represents a minimum. The search method and the order of the search method used in the CU unit improvement search step (S403) may follow a predefined order, or information on which search method is used may be transmitted through a high level syntax.

In the process of deriving motion information in the decoder side according to the present invention, after performing the CU unit improvement step (S400), whether to perform the sub-block unit improvement step (S410) is determined through the SUB-BLOCK unit improvement step (S420). As a result of the step S410, only when it is determined that the SUB-BLOCK unit improvement step (S420) is performed (S410, 'Yes' branch), SUB-BLOCK unit improvement step (S420) is performed.

In the step S410, in determining whether to perform the SUB-BLOCK unit improvement step, when the CU unit optimal motion information determined in the current CU unit motion information derivation step (S400) exists, whether to perform the SUB-BLOCK unit improvement step (S420)) is determined to be true (Yes). Here, the meaning that the optimal motion information of a CU unit is present means that a case where a motion candidate list for CU unit motion derivation is constructed and motion derivation is possible using at least one motion information of the motion candidates included in the corresponding constructed list.

The SUB-BLOCK unit improvement step (S420) includes: a SUB-BLOCK unit motion candidate list generation step (S421); SUB-BLOCK unit optimal motion determination step (S422); and a SUB-BLOCK unit improvement search step (S423). In addition, the SUB-BLOCK unit improvement step (S420) is performed sequentially for all of the plurality of SUB-BLOCKs in the current target block.

The SUB-BLOCK unit motion candidate list generation step (S421) is a step of generating a motion candidate list required for initial search position selection in order to derive motion of the SUB-BLOCK unit in the decoder side.

Here, motion candidates to be added to the motion candidate list may be predefined and added in the same order in the encoder and decoder. However, when the CU unit improvement step is performed prior to generating the SUB-BLOCK unit motion candidate list, the optimal motion information determined in the CU unit is included in the SUB-BLOCK unit motion candidate list. In relation to this, the method of constructing the SUB-BLOCK unit motion candidate list will be described later in detail in FIGS. 15(a) and 15(b).

The SUB-BLOCK unit optimal motion determination step (S422) is a step of selecting one motion candidate having a minimum value (cost) among a plurality of motion candidates by sequentially searching for the motion candidates added to the motion candidate list determined in the SUB-BLOCK unit motion candidate list generation step (S421).

The SUB-BLOCK unit improvement search step (S423) is a step of finally determining the SUB-BLOCK unit optimal motion by performing additional search using the motion information determined in the SUB-BLOCK unit optimal motion determination step (S422) as a starting position.

In determining one motion candidate in the SUB-BLOCK unit, different optimal motion information determination values may be used according to a motion derivation method of the decoder side. According to an embodiment of the present invention, in the case of a method for deriving motion using template matching, SAD for determining similarity between pixels included in a block may be used as a cost used to determine the one motion candidate. On the other hand, in the case of a method for deriving motion using bidirectional matching (BM), the rate-distortion value (RD-cost) derived by the weighted sum of SAD for determining similarity between pixels included in a block and size information of the motion vector may be used as the cost used to determine the one motion candidate. The rate-distortion value may be expressed as Equation (1) below.

$$RDcost = SAD + W*(|mvx - mv'y| + |mvy - mv'y|) \quad \text{[Equation 1]}$$

w denotes a weight for size information of the motion vector, mv denotes an optimal motion vector of the CU unit, and mv' denotes a target motion vector searched in units of SUB-BLOCKs. However, it is not limited to the use of the rate-distortion value, and SAD, SATD, and SSE may be used alone, and the weight may be changed depending on the case.

Hereinafter, a method of improving motion information in terms of a decoder will be described in detail. This embodiment may be applied in the above-described CU unit improvement step and/or SUB-BLOCK unit improvement step.

The pre-reconstructed motion information for the current block may be improved based on predetermined delta motion information, which may be expressed as Equation 2 below.

$$MV_{ref} = MV_{rec} + \text{deltaMV} \quad \text{[Equation 2]}$$

In Equation 2, $MV_{ref}$ means improved motion information, and $MV_{rec}$ and deltaMV may mean pre-reconstructed motion information and delta motion information, respectively. The decoder may set the initial value of delta motion information to 0. The decoder may determine an optimal reference block by performing a search based on the position of the reference block of the current block. Here, the reference block of the current block may mean an area indicated by the pre-reconstructed motion information. The decoder may update delta motion information based on the position of the optimal reference block. Here, the reference block may include an L0/L1 reference block. The L0 reference block may refer to a reference block belonging to a reference picture in the reference picture list 0 (L0), and the L1 reference block may refer to a reference block belonging to a reference picture in the reference picture list 1 (L1).

Specifically, the decoder may determine a search area for improving motion information (S1). The search area may be determined as a region including at least one of a reference block or an adjacent region of the reference block. Here, the position of the top-left sample of the reference block may be a reference position of the search. The search area may be determined for the L0 direction and the L1 direction, respectively. The adjacent area may mean an area extended by N sample lines from a boundary of a reference block. Here, N may be an integer of 1, 2, 3 or more.

The adjacent area may be located in at least one of left, top, right, bottom, top-left, bottom-left, top-right, or bottom-right of the reference block. Here, when the current block is W×H, the search area may be expressed as (W+2N)×(H+2N). However, in order to reduce the complexity of the improvement process, the adjacent area may be located in only some of the above-described directions. For example, it may be limited to areas adjacent to the left and top of the reference block, or may be limited to areas adjacent to the right and bottom of the reference block.

The number N of sample lines may be a fixed value pre-defined in the decoder, or may be variably determined in consideration of a block attribute. Here, the block attribute may mean a size/shape of a block, a block position, an inter prediction mode, a component type, and the like. The block position may mean whether the reference block adjoins a boundary of a picture or a predetermined fragment area. The fragment area may mean a tile, a coding tree block column/row, or a coding tree block. For example, depending on the block attribute, any one of 0, 1, or 2 sample lines may be selectively used.

The decoder may determine a list (hereinafter referred to as a SAD list) specifying a sum of absolute difference (SAD) for each search position in the search area (S2).

The SAD list may include a plurality of SAD candidates. The number of SAD candidates constituting the SAD list is M, and M may be an integer greater than or equal to two. The M may be limited to a maximum of nine.

The SAD candidate may be determined by the SAD value between the L0 block and L1 block. Here, the SAD value may be calculated based on all samples belonging to the L0/L1 block, or may be calculated based on some samples in the L0/L1 block. Here, some samples mean a sub-block of the L0/L1 block, and at least one of the width or height of the sub-block may be half the width or height of the L0/L1 block. That is, the L0 and L1 blocks have a size of W×H, and some of the samples may be the sub-block having a size of W×H/2, W/2×H or W/2×H/2. In this case, when some samples are W×H/2, some samples may be a top sub-block (or bottom sub-block) in the L0/L1 block. When some samples are W/2×H, some samples may be a left sub-block (or right sub-block) in the L0/L1 block. When some samples are W/2×H/2, some samples may be a top-left sub-block in the L0/L1 block, but are not limited thereto. Alternatively, some samples may be defined as a group of even or odd sample lines (vertical or horizontal direction) of the L0/L1 block. Also, here, some samples may be a block that are sub-sampled in the width or height direction of the L0/L1 block. That is, the L0 and L1 blocks have a size of W×H, and the blocks corresponding to some samples have a size of W×H, but may be one of a set of odd rows, a set of even rows, a set of odd columns, or a set of even columns among the samples included in the block.

The position of the L0 block may be determined based on the position of the L0 reference block of the current block and a predetermined offset. The offset may mean a shift vector between the position of the L0 reference block and the search position. That is, the search position may be a position shifted by p in the x-axis direction and q in the y-axis direction from the position (x0,y0) of the L0 reference block. Here, p and q may be at least one of −1, 0, or 1. Here, the shift vector generated by the combination of p and q may mean the offset. The position of the L0 block may be determined as a position shifted by (p,q) from the position (x0,y0) of the L0 reference block. The size (or absolute value) of p and q is 0 or 1, but is not limited thereto. For example, the sizes of p and q may be 2, 3, or more.

The offset may include at least one of a non-directional offset (0,0) or a directional offset. The directional offset may include an offset for at least one direction of left, right, top, bottom, top-left, top-right, bottom-left or bottom-right. For example, the directional offset is at least one of (−1,0), (0,1), (0,−1), (0,1), (−1,−1), (−1,1), (1,−1) or (1,1).

Similarly, the position of the L1 block may be determined based on the position of the L1 reference block of the current block and a predetermined offset. Here, the offset of the L1 block may be determined based on the offset of the L0 block. For example, when the offset of the L0 block is (p,q), the offset of the L1 block may be determined as (−p,−q).

The information regarding the size and/or direction of the aforementioned offset may be pre-defined in the decoder, or encoded in an encoder and signaled to the decoder. The information may be variably determined in consideration of the above-described block attribute.

As an example, the offset may be defined as in Table 1 below.

TABLE 1

| i | 0 | 1 | 2 | 3 | 4 | 5 | 6 | 7 | 8 |
|---|---|---|---|---|---|---|---|---|---|
| dX[i] | −1 | 0 | 1 | −1 | 0 | 1 | −1 | 0 | 1 |
| dY[i] | −1 | −1 | −1 | 0 | 0 | 0 | 1 | 1 | 1 |

Table 1 defines an offset for determining a search position for each index i. However, Table 1 does not limit the position of the offset corresponding to index i, and the position of the offset for each index may be different from Table 1. The offset according to Table 1 may include the aforementioned non-directional offset (0,0) and 8 directional offsets.

In this case, the 0th SAD candidate may be determined based on the position (x,y) of the reference block and offset (−1,−1). Specifically, a position shifted by an offset (−1,−1) from a position (x0,y0) of the L0 reference block is set as a search position, and a W×H block of which the top-left sample is the search position may be determined as an L0 block.

Similarly, a position shifted by an offset (1,1) from a position (x1,y1) of the L1 reference block may be set as a search position, and a W×H block of which the top-left sample is the search position may be determined as an L1 block. The 0th SAD candidate may be determined by calculating the SAD between the L0 block and the L1 block.

Through the above-described process, the 1st to 8th SAD candidates may be determined, and an SAD list including nine SAD candidates may be determined.

Table 1 does not limit the number of offsets for improving motion information. only k offsets of the nine offsets may be used. Here, k may be any value in the range of 2 to 8. For example, in Table 1, three offsets such as [0,4,8], [1,4,7], [2,4,6], [3,4,5] may be used, four offsets such as [0,1,3,4], [4,5,7,8] may be used, and six offsets such as [0,1,3,4,6,7], [0,1,2,3,4,5] may be used.

In one example, the offset may be defined as in Table 2 below. That is, the offsets are composed of only a non-directional offset (0,0), a horizontal offset ((−1,0), (1,0)) and a vertical offset ((0,−1), (0,1)).

TABLE 2

| i | 0 | 1 | 2 | 3 | 4 |
|---|---|---|---|---|---|
| dX[i] | 0 | −1 | 0 | 1 | 0 |
| dY[i] | −1 | 0 | 0 | 0 | 1 |

As such, according to the size and/or number of offsets, the size and/or shape of the aforementioned search area may be variably determined. The search area may have a geometric shape other than a square, and this will be described with reference to FIGS. 9(a) and 9(b).

The decoder may select either the first method or the second method for improving the motion information of the current block based on the SAD candidate of the SAD list described above (S3).

The selection may be performed based on a comparison result between a reference SAD candidate and a predetermined threshold (Embodiment 1).

The reference SAD candidate may mean an SAD candidate corresponding to the offset (0,0). Alternatively, the reference SAD candidate may mean a SAD candidate corresponding to a position of a reference block or a reference position changed by the first method described later.

The threshold may be determined based on at least one of the width (W) or height (H) of the current block (or the reference block). For example, the threshold may be determined as W*H, W*(H/2), (W/2)*H, 2*W*H, 4*W*H, or the like.

If the reference SAD candidate is greater than or equal to a threshold, delta motion information may be updated based on the first method, otherwise delta motion information may be updated based on the second method.

(1) In the Case of the First Method

Among the SAD candidates belonging to the SAD list, the SAD candidate having the minimum value may be identified. The identification method will be described later. Delta motion information may be updated based on the offset corresponding to the identified SAD candidate.

Then, the search position corresponding to the identified SAD candidate may be changed to a reference position for search. Based on the changed reference position, the above-described process of determining SAD list and/or identifying a SAD candidate having the minimum value may be performed again, and duplicate description will be omitted. Based on the re-performance result, the delta motion information may be updated.

(2) In the Case of the Second Method

Delta motion information may be updated based on parameters calculated using all or part of SAD candidates belonging to the SAD list.

The parameter may include at least one of a parameter dX for the x-axis direction or a parameter dY for the y-axis direction. For example, the parameter may be calculated as follows, and will be described based on Table 1 described above for convenience of description.

When the sum of sadList[3] and sadList[5] is equal to (sadList[4]<<1), dX may be set to 0. Here, sadList[3] may be the SAD candidate corresponding to the offset (−1,0), sadList[5] may be the SAD candidate corresponding to the offset (1,0), and sadList[4] may be the SAD candidate corresponding to the offset (0,0).

When the sum of sadList[3] and sadList[5] is greater than (sadList[4]<<1), dx may be determined as in Equation 3 below.

$$dX=((sadList[3]-sadList[5])<<3)/(sadList[3]+sadList[5]-(sadList[4]<<1))$$ [Equation 3]

When the sum of sadList[1] and sadList[7] is equal to (sadList[4]<<1), dY may be set to 0. Here, sadList[1] may be the SAD candidate corresponding to the offset (0,−1), sadList[7] may be the SAD candidate corresponding to the offset (0,1), and sadList[4] may be the SAD candidate corresponding to the offset (0,0).

When the sum of sadList[1] and sadList[7] is greater than (sadList[4]<<1), dY may be determined as in Equation 4 below.

$$dY=((sadList[1]-sadList[7])<<3)/(sadList[1]+sadList[7]-(sadList[4]<<1))$$ [Equation 4]

Based on the calculated parameter, delta motion information may be updated.

Alternatively, the selection in S3 described above may be performed based on whether the reference SAD candidate is the minimum value among SAD candidates belonging to the SAD list (Embodiment 2).

For example, if the minimum value among the SAD candidates belonging to the SAD list is not the reference SAD candidate, the delta motion information is updated based on the first method, otherwise the delta motion information may be updated based on the second method. The first method and the second method are as described above, and detailed description will be omitted.

Alternatively, the selection in S3 described above may be performed based on the combination of Embodiment 1 and Embodiment 2 described above (Embodiment 3).

For example, when the reference SAD candidate is smaller than a threshold, delta motion information may be updated using the parameter according to the second method described above.

However, when the reference SAD candidate is greater than or equal to a threshold, an SAD candidate having a minimum value among SAD candidates belonging to the SAD list may be identified. When the identified SAD candidate is a reference SAD candidate, delta motion information may be updated using the parameter according to the second method described above. On the other hand, when the identified SAD candidate is not a reference SAD candidate, delta motion information may be updated according to the first method described above.

A method of identifying the SAD candidate of the minimum value will be described. SAD candidates belonging to the SAD list may be grouped into two, three, or more number. Hereinafter, for convenience of description, a case in which SAD candidates are grouped into two groups will be described.

A plurality of SAD candidates may be grouped into a first group and a second group. Each group may include at least two SAD candidates among SAD candidates in the SAD list. However, the group may be limited to not include a reference SAD candidate. By applying a minimum operation to each group, the SAD candidate having the minimum value for each group may be extracted.

The SAD candidate (hereinafter referred to as temporary SAD candidates) having the minimum value among the SAD candidate extracted from the first group and the SAD candidate extracted from the second group may be extracted again.

Based on the comparison result between the temporary SAD candidate and the reference SAD candidate, the SAD candidate of the minimum value may be identified. For example, when the temporary SAD candidate is less than the reference SAD candidate, the temporary SAD candidate may be identified as the minimum SAD candidate in the SAD list. On the other hand, when the temporary SAD candidate is greater than or equal to the reference SAD candidate, the reference SAD candidate may be identified as the minimum SAD candidate in the SAD list.

The above-described method of improving motion information in the decoder-side may be performed, based on the block size, in units of sub-blocks. For example, when the size of the current block is greater than or equal to a predetermined threshold size, a method of improving motion information in units of the threshold size may be performed. On the other hand, when the size of the current block is less than a predetermined threshold size, a method of improving motion information in units of the current block may be performed. Here, the threshold size may be determined that at least one of the block width or height is a T value. The T value may be an integer of 16, 32, 64 or more.

The above-described method of improving motion information in the decoder-side may be limitedly performed in consideration of a block size, a distance between a current picture and a reference picture, an inter prediction mode, a prediction direction, a unit or resolution of motion information, and the like.

For example, the improvement method may be performed only when one of the width or height of the current block is greater than or equal to 8, 16, or 32. Alternatively, the improvement method may be applied only when the width and height of the current block are greater than or equal to 8, 16, or 32. Alternatively, the improvement method may be applied only when the area or the sample number of the current block is greater than or equal to 64, 128, or 256.

The improvement method may be applied only when the difference in POC between the current picture and the L0 reference picture and the difference in POC between the current picture and the L1 reference picture are the same.

The improvement method may be applied only when the inter prediction mode of the current block is a merge mode, and the improvement method may not be applied in other modes (e.g., affine mode, AMVP mode, etc.).

The improvement method may be applied only when the current block performs bidirectional prediction. In addition, the improvement method may be applied only when the unit of motion information is an integer pel, or the improvement method may be applied only when the unit of motion information is less than a quarter pel or a half pel.

Figure 7:
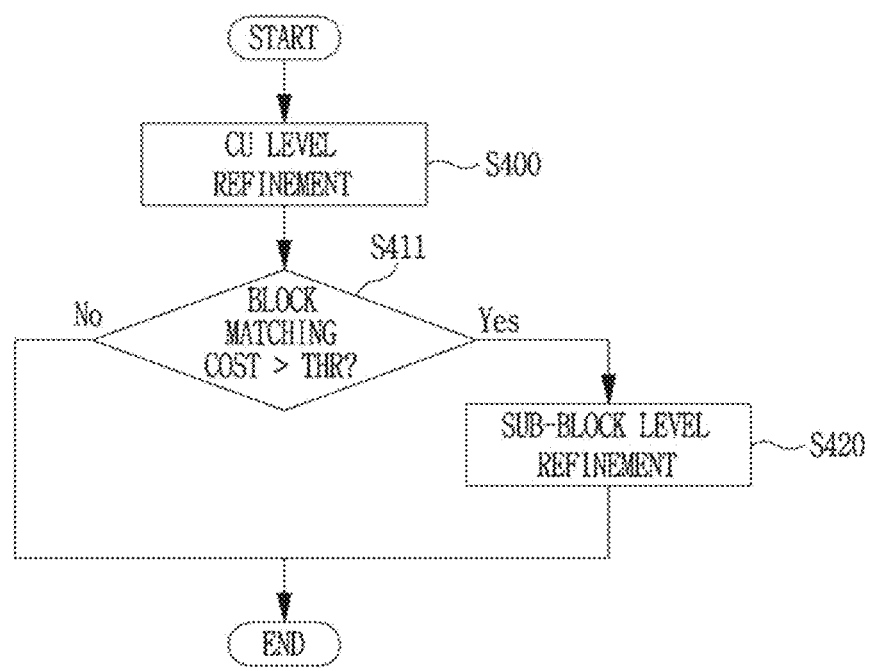

FIG. 7 is a diagram illustrating another flowchart of a decoding method according to an embodiment of the present invention. In particular, when a mode for deriving motion information in the decoder side is selected for the current block, it is an example of a criterion for determining whether to perform the SUB-BLOCK unit improvement step (S420). According to FIG. 7, when the block matching cost is calculated using the motion selected in the CU unit improvement step (S400), the block matching cost value is compared with a predefined threshold value (THR) (S411). When the block matching cost value is less than or equal to the threshold value (THR), it may be determined that the SUB-BLOCK unit improvement step S420 is not performed. That is, it may be determined that the SUB-BLOCK unit improvement step S420 is performed only when the block matching cost value is greater than the threshold value (THR).

According to an embodiment of the present invention, the predefined threshold value (THR) may be set to '0'. This means that when template matching (TM) or bidirectional matching (BM) is performed using the optimal motion derived in the CU unit improvement step (S400), there is no error between the templates used for block matching or the reference blocks. However, the threshold value is not limited to '0', and may be the predefined value or transmitted through a high-level syntax. Therefore, it is possible to efficiently reduce complexity by determining whether to perform additional SUB-BLOCK unit improvement using the block matching value.

Through steps S410 of FIG. 6 and step S411 of FIG. 7, it is possible to early terminate the motion information derivation process without performing the SUB-BLOCK unit improvement step (S420) under a specific condition, which can greatly contribute to reduction of decoding complexity.

However, the early termination determination step (S411) using the block matching cost is not limited to being performed only in the CU unit improvement step (S400) and the SUB-BLOCK unit improvement step (S420) illustrated in FIG. 7, and it can be applied to a plurality of steps of calculating the block matching cost by using the motion prediction method of the decoder side proposed by the present invention. That is, in the process of calculating the block matching cost, since the calculation of the block matching cost is terminated when the same condition as the step S411 are satisfied, it can contribute to the reduction of decoding complexity.

Figure 8:
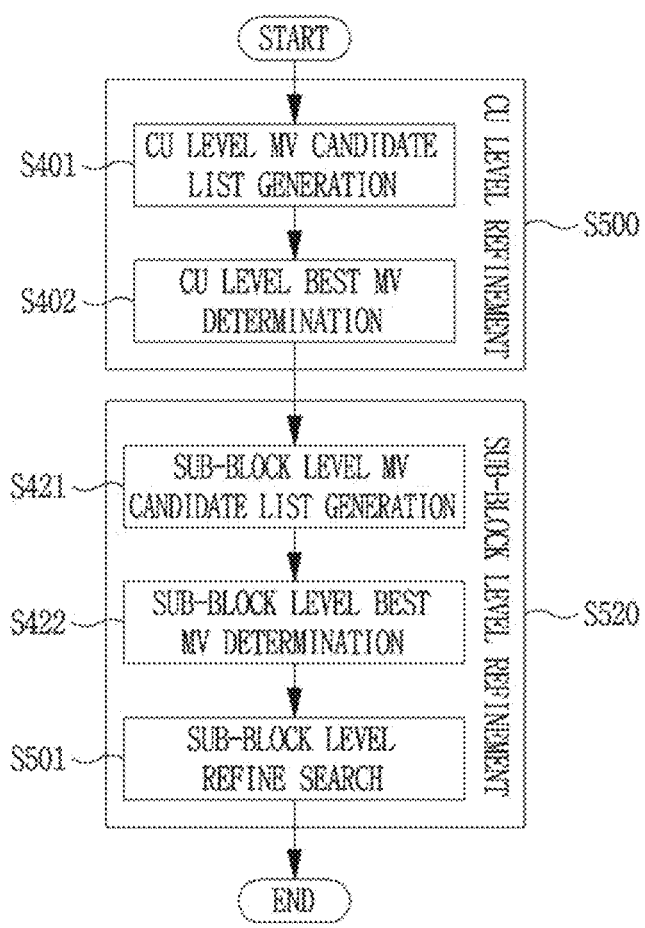
FIG. 8 is a diagram illustrating another flowchart of a decoding method according to an embodiment of the present invention.

FIG. 8 is a diagram illustrating another flowchart of a decoding method according to an embodiment of the present invention. In particular, it illustrates a flow diagram of motion derivation that performs only SUB-BLOCK unit improvement search without performing CU unit improvement search. That is, according to an embodiment of the present invention, in order to perform motion derivation of the decoder side, the CU unit improvement search is not performed, and only the SUB-BLOCK unit improvement search may be performed.

Referring to FIG. 8, the motion derivation process for performing only the SUB-BLOCK unit improvement search does not include the CU unit improvement search (S403) included in the CU unit improvement step, unlike the motion derivation process illustrated in FIG. 6 described above, instead further improved SUB-BLOCK unit improvement search (S501) is included. However, since only the SUB-BLOCK unit improvement search (S501) is performed without the CU unit improvement search, the search is performed using a more detailed search method than the SUB-BLOCK unit improvement search (S423) of FIG. 6 described above. On the other hand, since the CU unit improvement search step is not performed and only the SUB-BLOCK unit improvement search is performed, it is possible to effectively reduce the complexity generated in the motion derivation process.

Referring to FIG. 8, the motion derivation process of the decoder side includes a CU unit motion candidate list generation step (S401), a CU unit optimal motion determination step (S402), a SUB-BLOCK unit motion candidate list generation step (S421), and a SUB-BLOCK unit optimal motion determination step (S422). The operation of each step is the same as the steps (S401, S402, S421, and S422) in FIG. 6 described above. Instead, an embodiment according to the present invention is characterized by supplementing the SUB-BLOCK unit improvement search step 501.

Specifically, in the SUB-BLOCK unit improvement search step S423 illustrated in FIG. 6 described above, a plurality of search steps such as CU unit improvement search and SUB-BLOCK unit optimal motion determination step are performed to search for the optimal motion. Therefore, it is possible to perform a motion improvement search using a cross search and an adaptive cross search which have a relatively low search complexity.

On the other hand, in case of performing only the SUB-BLOCK unit improvement search illustrated in FIG. 8, the SUB-BLOCK unit improvement search step 501 does not performed the CU unit improvement search, and searches for the optimal motion using only a plurality of predefined motion information. Therefore, the first search is performed using a diamond search having a relatively high search complexity, and then the second search is performed using a cross search. However, it is not limited to using only a diamond search as a search method having a relatively high search complexity. Square search, hexagon search, and the like may be additionally used, and the motion improvement search may be performed by using multiple different steps.

Hereinafter, a method of improving motion compensation in the decoder side will be described in detail. This embodiment may be applied to the SUB-BLOCK unit improvement step. However, the present invention is not limited thereto, and may be applied in the same/similar manner in the above-described CU unit improvement step.

The decoder may improve motion compensation in consideration of a gradient of a sample belonging to a predetermined reference area, hereinafter referred to as a GMC method.

The decoder may determine a predetermined reference area for the GMC method. The reference area may be determined as an area including at least one of a reference block of a current block or an adjacent area of the reference block. The reference area may be determined for the L0 direction and the L1 direction, respectively. The adjacent area may mean an area extended by K sample lines from on a boundary of a reference block, where K may be an integer of 1, 2, 3 or more.

The adjacent area may be located in at least one direction of left, top, right, bottom, top-left, bottom-left, top-right, or bottom-right of the reference block. Here, when the current block is W×H, the reference area may be expressed as (W+2K)×(H+2K). However, in order to reduce the complexity of the improvement process, adjacent areas may be located in only some of the above-described directions. For example, it may be limited to areas adjacent to the left and top of the reference block, or may be limited to areas adjacent to the right and bottom of the reference block.

The number of sample lines (K) may be a fixed value pre-defined in the decoder, or may be variably determined in consideration of the block attribute. Here, the block attribute may mean a size/shape of a block, a block position, an inter prediction mode, a component type, and the like. The block position may mean whether the reference block adjoins a boundary of a picture or a predetermined fragment area. The fragment area may refer to a tile, a coding tree block column/row, or a coding tree block. For example, depending on the block attribute, any one of 0, 1, or 2 sample lines may be selectively used.

The decoder may calculate a gradient of a sample belonging to the reference area. The gradient of the current sample may be calculated as a difference between a plurality of neighboring samples adjacent to the current sample. The plurality of neighboring samples may be located on the same horizontal line and/or vertical line as the current sample. Alternatively, a plurality of neighboring samples may be located on the same diagonal line as the current sample. Alternatively, one of the plurality of neighboring samples may be located on a different line from the other. The number of the plurality of neighboring samples may be 2, 3, 4, or more.

The gradient may be calculated for at least one of the L0 reference area or the L1 reference area. Here, the gradient for the L0/L1 reference area may be calculated for at least one of the horizontal direction (H) or the vertical direction (V).

For example, a gradient (gradientHL0) in the horizontal direction with respect to the L0 reference area may be calculated based on a difference between two neighboring samples that are adjacent to the left and right of the current sample. A gradient (gradientVL0) in the vertical direction with respect to the L0 reference area may be calculated based on a difference between two neighboring samples that are adjacent to the top and bottom of the current sample. Gradients (gradientHL1, gradientVL1) in the horizontal/vertical directions with respect to the L1 reference area may be calculated in the same manner as described above.

Through the above-described method, it is possible to calculate gradients for samples in the reference area, respectively. However, the gradient of a sample located at the boundary of the reference area (hereinafter referred to as a boundary sample) may share the gradient of a neighboring sample adjacent to the boundary sample.

For example, the gradient of the top boundary sample of the reference area may be set as the gradient of a neighboring sample below the top boundary sample. The gradient of the bottom boundary sample of the reference area may be set as the gradient of a neighboring sample above the bottom boundary sample. The gradient of the left boundary sample of the reference area may be set as the gradient of a neighboring sample adjacent to the left of the left boundary sample. The gradient of the right boundary sample of the reference area may be set as the gradient of a neighboring sample adjacent to the right of the right boundary sample. A corner boundary sample of the reference area may be set as a gradient of a neighboring sample diagonally adjacent to the corner boundary sample. Samples in the 2×2 area located at each corner of the reference area may share the same gradient.

The decoder may determine one or more parameters for the GMC method. The parameter may be derived based on at least one of a sample value of the L0/L1 reference area or a gradient of the sample. Specifically, the first parameter (diff) may be derived based on a sample value difference between the L0 reference area and the L1 reference area. The second parameter (tempH) may be derived based on at least one of the gradientHL0 or the gradientHL1 described above, and the third parameter (tempV) may be derived based on at least one of the gradientVL0 or the gradientVL1. For example, the parameter may be derived as in Equation 5 below.

diff[x][y]=(predSamplesL0[$h_x$][$v_y$]>>shift2)−(pred-
    SamplesL1[$h_x$][$v_y$]>>shift2)

tempH[x][y]=(gradientHL0[x][y]+gradientHL1
    [x][y])>>shift3 tempV[x][y]=(gradientVL0[x][y]+gradientVL1
    [x][y])>>shift3            [Equation 5]

In Equation 5, the first parameter (diff) for the sample at the (x,y) position may be derived based on the sample corresponding to the ($h_x$, $v_y$) position in the L0/L1 reference area, where $h_x$, $v_y$ is may be determined by the following Equation 6. In Equation 6, nCbW and nCbH mean the width and height of the current block (or reference block), respectively.

$h_x$=Clip3(1,nCbW,x)

$v_y$=Clip3(1,nCbH,y)            [Equation 6]

The decoder may derive a compensation value for improving motion compensation based on at least one of the previously determined gradient or parameter.

Specifically, the compensation value may be derived based on the motion offset and the gradient. The motion offset may be defined as at least one of a horizontal motion offset ($V_x$) or a vertical motion offset ($V_y$). Here, the gradient may include at least one of gradientHL0, gradientHL1, gradientVL0, or gradientVL1.

For example, the compensation value (mcOffset) may be derived by Equation 7 below.

mcOffset=Round(($V_x$*(gradientHL1[x+1][y+1]−gradi-
    entHL0[x+1][y+1]))>>1)+Round(($V_y$*(gradi-
    entVL1[x+1][y+1]−gradientVL0[x+1]
    [y+1]))>>1)            [Equation 7]

In Equation 7, $V_x$ may mean a horizontal motion offset. This may be determined based on at least one of the first parameter (diff) or the second parameter (tempH) described above. $V_y$ may mean a vertical motion offset. This may be derived based on at least one of a horizontal motion offset ($V_x$), the first parameter (diff), the second parameter (tempH), or the third parameter (tempW).

The decoder may generate a prediction sample of the current block using the reference block of the current block and the compensation value (mcOffset). Here, the reference block may include at least one of an L0 reference block or an L1 reference block.

For example, the decoder may generate a prediction sample of the current block by adding the compensation value to a weighted average value between a sample of the L0 reference block and a sample of the L1 reference block.

The above-described GMC method may be selectively used based on predetermined coding parameters. Here, the coding parameter may mean a block size/shape, a position of a reference picture, an inter prediction mode, a prediction direction, a component type, a difference between reference blocks, and the like. The coding parameter may include information derived from a decoder as well as information encoded and signaled by an encoder.

For example, it may be applied only when the current block is less or greater than a predetermined threshold size. The threshold size may be defined as a minimum size or a maximum size of a block in which the GMC method is allowed. At least one of the width or height of the threshold size may be 8, 16, 32 or 64. Alternatively, it may be applied only when the current block has a square shape. Alternatively, it may be applied only when one of the L0/L1 reference pictures has a smaller POC than the current picture and the other one has a larger POC than the current picture. Alternatively, it may be applied only when the sample value difference between the L0 reference block and the L1 reference block is greater than or equal to a predetermined threshold value. Here, the threshold value may be determined based on at least one of a bit depth or a width and height of a reference block (or current block).

The GMC method may be selectively performed based on any one of the above-described limitation conditions, or may be selectively performed based on a combination of at least two of the above-described limitation conditions.

Figure 9:
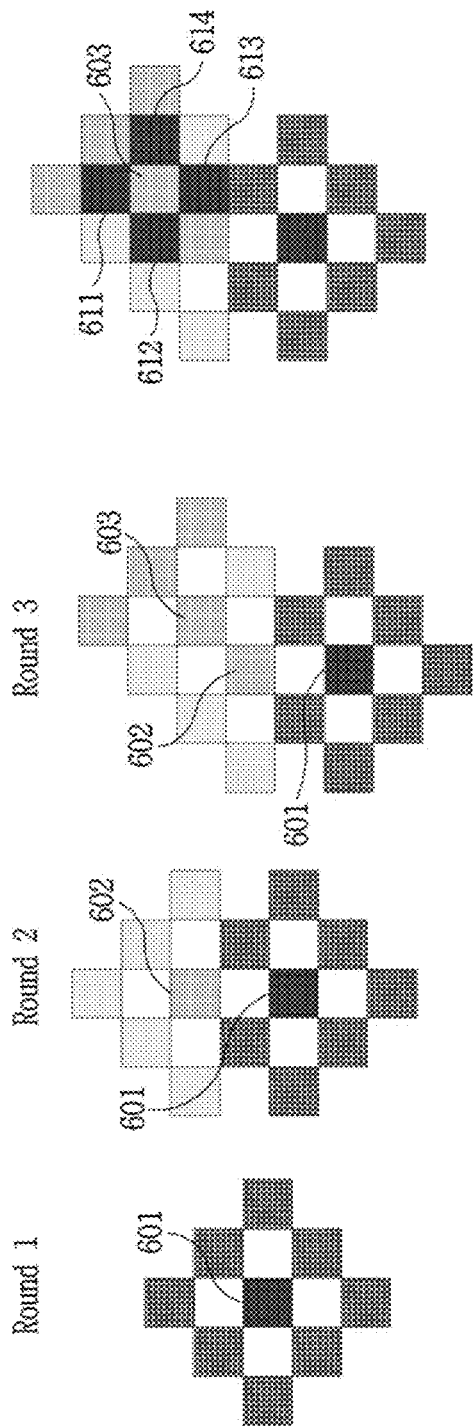
FIGS. 9(a) and 9(b) are diagram illustrating a diamond search and a cross search method.

FIG. 9 is a diagram illustrating a diamond search and a cross search method applied to the SUB-BLOCK unit improvement search step (S501). In particular, FIG. 9(a) illustrates a diamond search pattern as an example, and FIG. 9(b) illustrates a cross search pattern as an example.

Referring to FIG. 9(a), since a diamond search is performed in a plurality of steps or rounds, for example, the search is started from pixels surrounding a pixel 601 in the diamond direction (Round 1). Here, the pixel 601 corresponds to an initial starting position (e.g., an optimal motion candidate position). The pixel 602 having the lowest cost value is selected according to a result of the Round 1 search, and the same diamond search for the pixel 602 is performed (Round 2). In addition, the pixel 603 having the lowest cost is selected according to a result of the Round 2 search, and the same diamond search for the pixel 603 is performed (Round 3). The diamond search round may be repeatedly performed until it is reached to a target cost, or it may be defined as being performed a predefined number of times (e.g., 3 rounds).

FIG. 9(b) illustrates an example of a cross search, for example, when the diamond search round is terminated, the cross search is performed on the pixels 611, 612, 613, and 614 surrounding the finally selected pixel 603 vertically and horizontally. After the cross search, the pixel position having the lowest cost value is determined as the final motion information position.

Figure 10:
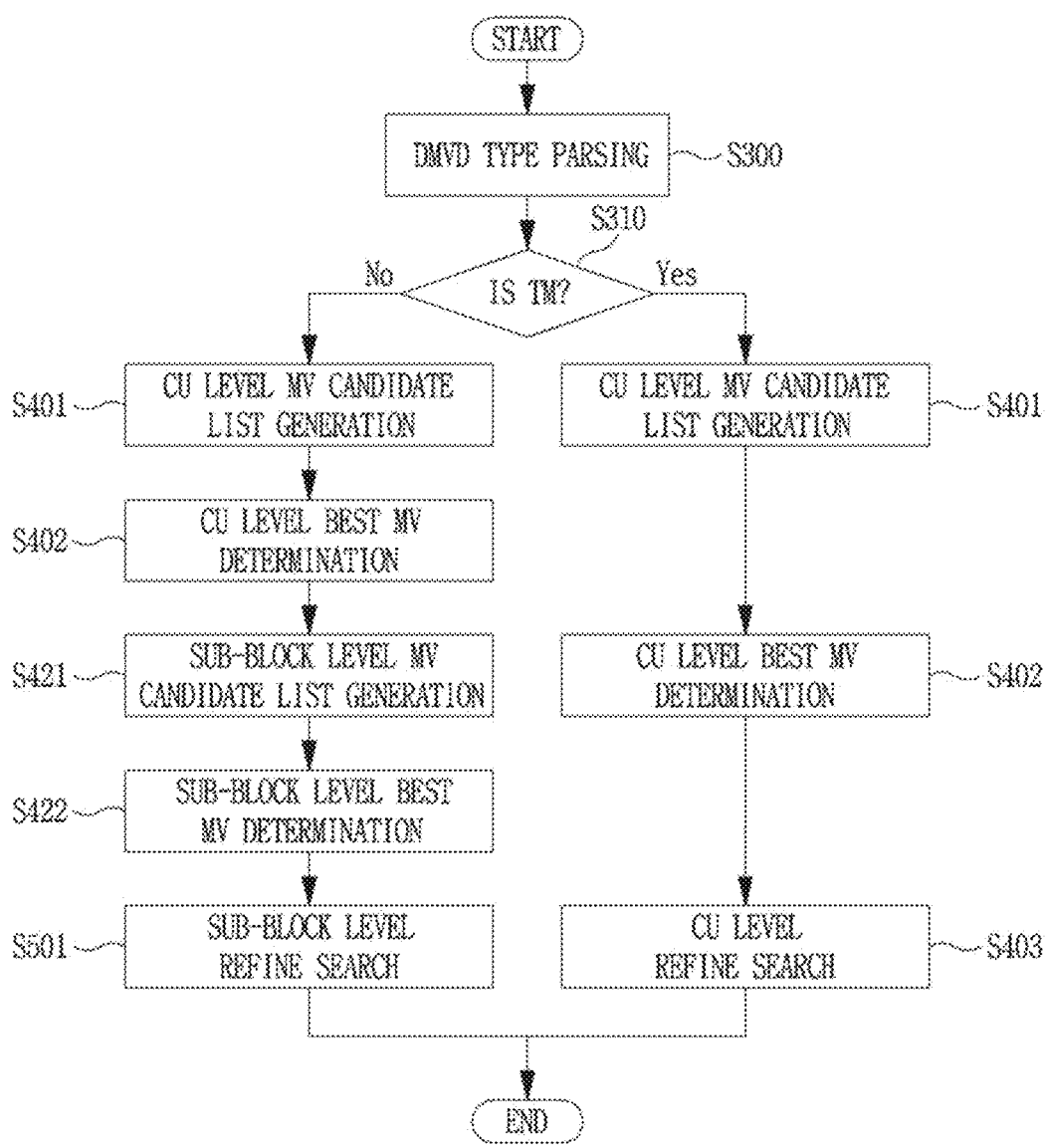
FIGS. 10 and 11 are a diagram illustrating another flowchart of a decoding method according to an embodiment of the present invention.

FIG. 10 is a diagram illustrating another flowchart of a decoding method according to an embodiment of the present invention. In particular, it is a flow chart illustrating that different motion information correction methods are used according to a target motion information derivation method when one or more motion information derivation methods are used to derive motion information of the decoder side.

Referring to FIG. 10, in the case of using template matching (TM) and bidirectional matching (BM) as motion information derivation methods of the decoder side, only CU unit motion derivation and correction are performed when performing motion derivation with template matching. On the other hand, when motion derivation with bidirectional matching is performed, an initialization process for motion search is performed in CU units, and motion derivation and correction in SUB-BLOCK units are performed.

Accordingly, when one or more motion information derivation methods are used to derive motion information of the decoder side, it means that a block unit for deriving different motion information according to the target motion information derivation method is used. For example, when performing motion derivation using template matching, it is possible to perform motion derivation in CU units. When performing motion derivation using bidirectional matching, it is possible to perform motion derivation in SUB-BLOCK units.

Specifically, through steps S300 and S310, if a motion information derivation mode of the decoder side is selected for the current target block and a mode for deriving motion using a template matching method is selected (S310 'Yes' branch), CU unit motion candidate list generation step (S401), a CU unit optimal motion determination step (S402) and a CU unit improvement search step (S403) are included.

On the other hand, through steps S300 and S310, if a motion derivation mode of the decoder side is selected for the current target block and a mode for deriving motion using a bidirectional matching method (S310 'No' branch) is selected, CU unit motion candidate list generation Step S401, CU optimal motion determination step S402, SUB-BLOCK unit motion candidate list generation step S421, SUB-BLOCK unit optimal motion determination step S422, and SUB-BLOCK unit improvement search step S501 are included.

Figure 11:
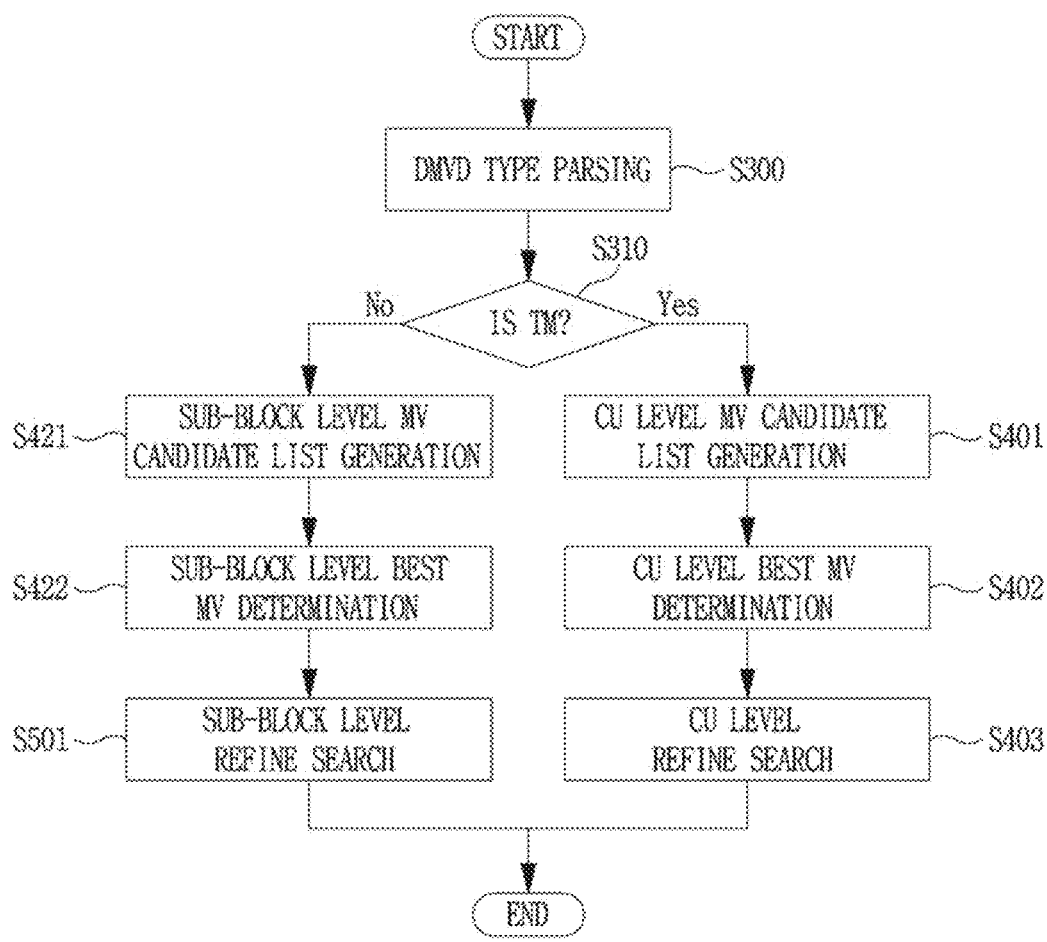

Alternatively, as illustrated in FIG. 11, through steps S300 and S310, when a motion information derivation mode of the decoder side is selected for the current target block and a mode for deriving motion using a bidirectional matching method is selected (S310 'No' branch), the above-described CU unit motion candidate list generation step (S401) and CU unit optimal motion determination step (S402) may be omitted, only the SUB-BLOCK unit motion candidate list generation step (S421), the SUB-BLOCK unit optimal motion determining step (S422) and the SUB-BLOCK unit improvement searching step (S501) may be included.

Figure 12A:
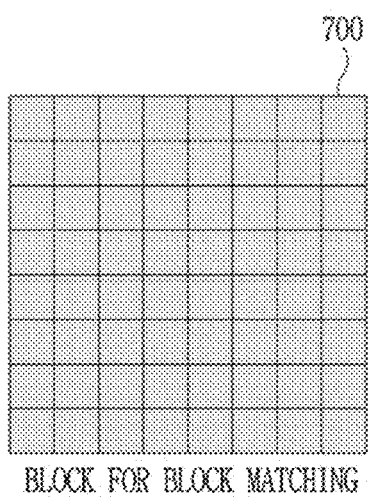
FIGS. 12(a) and 12(b) illustrate an example of a target block performing block matching and subsampled pixels in the block.
Figure 12B:
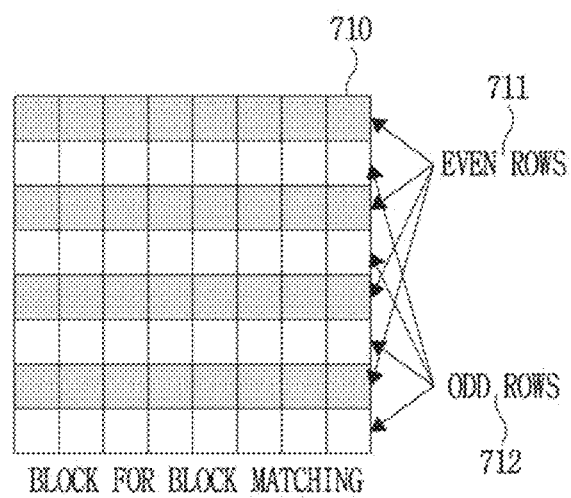

FIGS. 12(a) and 12(b) illustrate a target block performing block matching and target pixels in the block. FIGS. 12(a) and 12(b) illustrate a target block performing block matching and target pixels in the block. In particular, FIG. 12(a) illustrates a method of calculating an error between a target block and a reference block using all the pixels in the block 700 in general block matching, while FIG. 12(b) illustrates an example of a method of calculating an error between a target block and a reference block using only some pixels (e.g., 711 or 712) in the block 710 to reduce the computational complexity required for block matching.

For example, according to an embodiment of the present invention, the 710 block is classified into the pixels belonging to the even row (EVEN ROWS) 711 and the pixels belonging to the odd row (ODD ROWS) 712 by subsampling the 710 block. In calculating the block matching cost, an error between blocks, etc., computation complexity may be reduced by calculating based on only pixels belonging to the even row or pixels belonging to the odd row.

In this case, a criterion for classifying target pixels used for matching to reduce the computational complexity is not limited to even and odd rows, and a method of determining a target row in units of integer rows that is a multiple of 2 or a method of determining using only pixels adjacent to the current block may be used. Hereinafter, a case where the above-described template matching (TM) and bidirectional matching (BM) are applied using the subsampled pixels in the block will be described.

Figure 13:
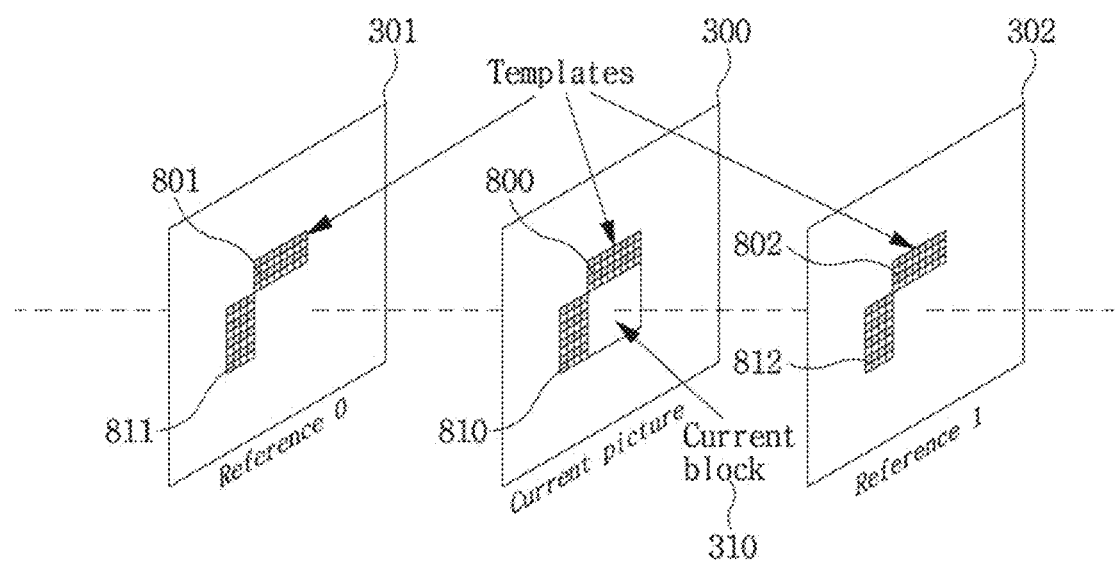
FIG. 13 illustrates a method of applying the subsampled pixels of FIGS. 12(a) and 12(b) described above to a method of deriving motion information using template matching.

FIG. 13 illustrates the concept of applying matching using the subsampled pixels of FIGS. 12(a) and 12(b) to the motion information derivation method using template matching among the methods of deriving motion information in the decoder side.

As described above, deriving motion information using template matching is a method of deriving motion information based on pixel similarity between a plurality of pixels spatially adjacent to the current target block 310 in the current encoding and decoding target picture 300 and a plurality of pixels with the same shape which are located in reference pictures 301 and 302. A plurality of pixels spatially adjacent to the current target block 300 and pixels of the same shape located in the reference pictures 301 and 302 are referred to as a template. In this case, in configuring the template, as illustrated in FIGS. 12(a) and 12(b) described above, rather than using all pixels included in a specific template range, some subsampled pixels may be used to reduce computational complexity.

Specifically, one or more templates may be configured for the current target block 300, and as illustrated in FIG. 13, a template 800 adjacent to the top and a template 810 adjacent to the left may be used, each template may be configured as the template having the same shape and size in the reference picture. However, the matching is not performed using all the pixels in the template, such as the templates 320 and 330 illustrated in FIG. 3, but only specific pixels among the pixels in the template 800 and 810 are used for template matching.

The template configured in the reference picture may be composed of the top template 801 and 802 corresponding to the template 800 adjacent to the top of the current target block 300 and the left template 811, 812 corresponding to the template 810 adjacent to the left of the current target block 300. At this case, whether the top and left adjacent pixels are configurable is checked, and the template is configured only when the template is configurable using the top and left adjacent pixels. The template matching may be performed by using some template except for the non-configurable template of the predefined one or more templates. A case where the template is not configurable may correspond to a case where the current target block is located at a boundary of a picture, tile, and slice.

Figure 14:
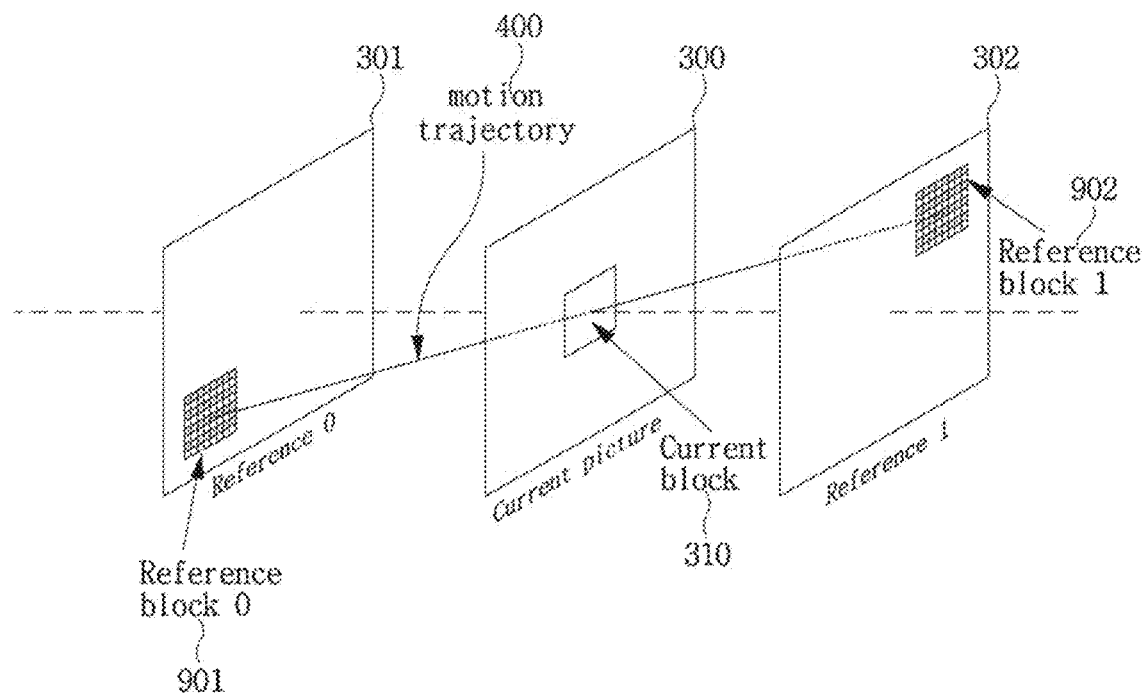
FIG. 14 illustrates a method of applying the subsampled pixels of FIGS. 12(a) and 12(b) described above to a method of deriving motion information using bidirectional matching.

FIG. 14 illustrates the concept of applying matching using the subsampled pixels of FIGS. 12(a) and 12(b) to the motion information derivation method using bidirectional matching among the methods of deriving motion information in the decoder side.

As described above, deriving motion information using bidirectional matching is a method of deriving motion information based on pixel similarity of two different reference blocks 901 and 902 in reference pictures 301 and 302 located in bi-directions around the current target block 310 in the current encoding and decoding target picture 300. At this case, two different reference blocks 901 and 902 in the reference pictures 301 and 302 located in bi-directions around the current target block 310 are selected using one motion trajectory (400).

Also, in the process of performing block matching using the two different reference blocks 901 and 902, all pixels included in the block are not used, and only some sub-sampled pixels in the blocks 901 and 902 are used. By doing so, the computational complexity may be reduced.

Specifically, according to an embodiment of the present invention, two different reference pictures 301 and 302 may be connected using one motion trajectory 400, with the current target block 310 as the center. Reference blocks 901 and 902 having the same size and shape corresponding to the current target block 310 may be configured at the connected position. However, matching is not performed using all the pixels in the reference block, such as the reference blocks 201 and 202 illustrated in FIG. 4, but only specific pixels among the pixels in the reference blocks 901 and 902 are used for bidirectional matching.

That is, the bidirectional matching method according to an embodiment of the present invention includes a process of configuring the reference blocks 901 and 902 of the same size and shape corresponding to the current target block 310 and obtaining one motion trajectory (400) that minimizes an error between some pixels in two reference blocks 901 and 902.

FIGS. 15(a) and 15(b) is a diagram for explaining a method of constructing a motion candidate list for initial search location selection in order to derive motion information in the decoder side.

FIG. 15(a) is an embodiment of a construction of a CU unit motion candidate list 1000 in the above-described CU unit motion candidate list generation step (S401). Referring to FIG. 15(a) according to an embodiment of the present invention, when the current CU is in the AMVP mode, the AMVP candidate motion information 1501 may be added to the CU unit motion candidate list 1000, and CU unit motion candidates excluding sub-block unit motion candidates among merge candidates of the current target block may be added to the CU unit motion candidate list 1000. Additionally, up to four motion candidates 1503 generated by interpolating an unidirectional prediction candidate of the current target sub-block may be added, and spatially adjacent left and top motion candidates 1504 may be added to construct the CU unit motion candidate list 1000.

FIG. 15(b) is an embodiment illustrating the construction of the SUB-BLOCK unit motion candidate list 1010 in the SUB-BLOCK unit motion candidate list generating step S421. Referring to FIG. 15(b) according to an embodiment of the present invention, the CU unit optimal motion candidate 1511 of the target CU to which the current SUB-BLOCK belongs, motion candidates 1512 of left and top sub-blocks among SUB-BLOCKs spatially adjacent to the current SUB-BLOCK, motion candidates 1513 of top-left and top-right sub-blocks among SUB-BLOCKs spatially adjacent to the current SUB-BLOCK, a scaled motion candidate 1514 of co-located SUB-block of the reference picture, and a motion candidate corresponding to the current SUB-BLOCK among ATMVP 1515 and STMVP 1516 may be added to construct the SUB-BLOCK unit motion candidate list 1010.

However, in referring to the motion of the spatially adjacent left, top, top-left, and top-right for parallel processing of the current target sub-block, a specific area 1120 for parallel processing is set as described in FIG. 16 to be described later. And it may be changed to refer to the motion of the sub-blocks 1130 located outside the area.

Alternatively, for parallel processing of the current target sub-block, the SUB-BLOCK unit motion candidate list may be constructed except for spatially adjacent motions 1020.

Figure 16:
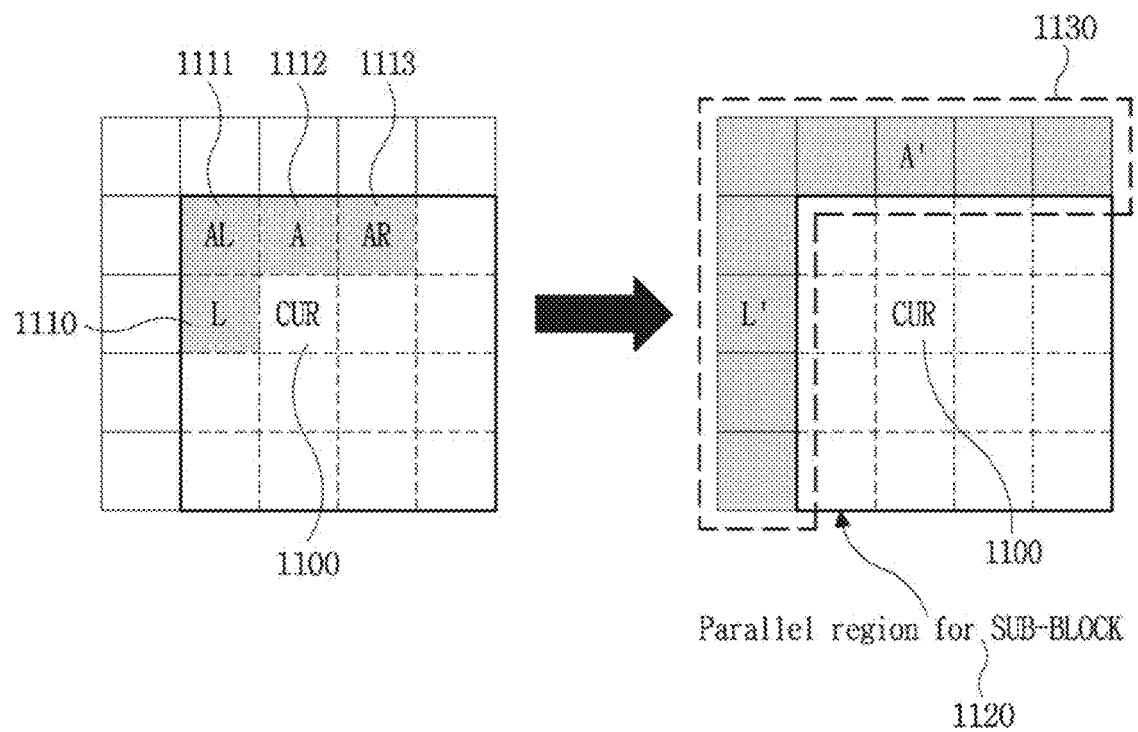
FIG. 16 illustrates the concept of parallel processing of sub-blocks according to the present invention.

FIG. 16 illustrates the concept of parallel processing of sub-blocks according to the present invention. In particular, in referring to spatially adjacent motions of sub-blocks, a concept of referring to motions located outside a specific area in consideration of parallel processing is illustrated.

A unit resulting from dividing one block to be encoded and decoded into a plurality of smaller blocks is referred to as a sub-block, and size information of a sub-block used in current encoding and decoding may be pre-defined or transmitted as a high-level syntax.

In referring to the spatially adjacent motion of the current target sub-block 1100 using a method of referring to the spatially adjacent motion of the existing sub-block, one or more of the motions of the left sub-block 1110, the top sub-block 1112, the top-left sub-block 1111 and the top-right sub-block 1113 are referred.

However, when referring to the motion of the left sub-block 1110, the top sub-block 1112, the top-left sub-block 1111, and the top-right sub-block 1113 using an existing method, the dependency (redundancy) between sub-blocks occurs since the motion determination process of the current target sub-block 1100 should be performed after the motion determination process of the corresponding sub-block 1100 is completed. In order to solve the dependency occurrence problem between the sub-blocks, in the present invention, a specific area 1120 for parallel processing is set in consideration of parallel processing of the sub-blocks, and the motion of sub-blocks 1130 located outside the corresponding area is referred.

The specific area 1120 for the parallel processing may be a single CU, an area defined by the number of a plurality of sub-blocks, or an area having a certain size, and the corresponding information may be predefined or transmitted as a high-level syntax.

In addition, when deriving motion information in the above-described decoder side, the concept of sub-block parallel processing in FIG. 16 may be applied when determining a motion candidate of a sub-block. In addition, it is equally applicable to a case in which motion information is not derived in the decoder side, and in particular, it may be equally applied in a sub-block unit motion information generation process and a sub-block unit motion reference process.

FIG. 17 illustrates, for example, a modified motion candidate list applied to the parallel processing of FIG. 16. Compared with the motion candidate list of FIGS. 15(a) and 15(b) described above, the CU unit motion candidate list 1000a is the same as the CU unit motion candidate list 1000 of FIGS. 15(a) and 15(b) described above. However, as parallel processing is performed in units of sub-blocks, when compared with the sub-block unit motion candidate list 1010 of FIGS. 15(a) and 15(b) described above, the Sub-block unit motion candidate list 1010a is constructed by excluding motion candidates 1512 of the left and top SUB-BLOCKs among sub-blocks spatially adjacent to the current sub-block and the motion candidate 1513 of the top-left and the torp-right SUB-BLOCKs among sub-blocks spatially adjacent to the current SUB-BLOCK.

Various embodiments of the present disclosure are not intended to list all possible combinations, but are intended to describe representative aspects of the present disclosure, and the matters described in various embodiments may be applied independently or in combination of two or more.

In addition, various embodiments of the present disclosure may be implemented by hardware, firmware, software, or a combination thereof. In the case of implementation by hardware, it may be implemented by one or more Application Specific Integrated Circuits (ASICs), Digital Signal Processors (DSPs), Digital Signal Processing Apparatus (DSPDs), Programmable Logic Apparatus (PLDs), Field Programmable Gate Arrays (FPGAs), general processors, controllers, microcontrollers, microprocessors, and the like.

The scope of the present disclosure includes software or machine-executable instructions (e.g., operating systems, applications, firmware, programs, etc.) that cause an operation according to various embodiment methods to be executed on a apparatus or computer, and such software or Instructions include a non-transitory computer-readable medium that is stored and executable on a apparatus or computer.

INDUSTRIAL APPLICABILITY

The present invention may be used in encoding/decoding a video signal.

The invention claimed is:

1. A method of decoding an image, comprising:
deriving initial motion information of a current block based on a merge candidate list including a plurality of merge candidates;
deriving delta motion information of the current block based on a sum of absolute difference (SAD) list for a search area, the SAD list including a plurality of SAD candidates;
updating the initial motion information of the current block based on the delta motion information; and
performing inter prediction on the current block based on the updated initial motion information,
wherein deriving the delta motion information is performed based on a comparison result between a reference SAD candidate and a predetermined threshold,
wherein the reference SAD candidate is representative of a SAD candidate corresponding to a non-directional offset, and
wherein when the reference SAD candidate is greater than or equal to the predetermined threshold, deriving the delta motion information comprises:
identifying a SAD candidate having a minimum value among the SAD candidates belonging to the SAD list; and
determining the delta motion information based on an offset corresponding to the identified SAD candidate.

2. The method of claim 1, wherein the search area is determined as an area including at least one of a reference block specified by the initial motion information or an adjacent area of the reference block, and
wherein the adjacent area is an area extended by N sample lines from a boundary of the reference block.

3. The method of claim 1, wherein the SAD candidate is determined by a SAD value between a L0 block and a L1 block, and
wherein the L0 block is determined based on a position of a L0 reference block of the current block and a predetermined offset, and the L1 block is determined based on a position of a L1 reference block of the current block and the predetermined offset.

4. The method of claim 3, wherein the offset includes at least one of a non-directional offset or a directional offset, and
wherein the directional offset includes an offset for at least one direction of left, right, top, bottom, top-left, top-right, bottom-left or bottom-right.

5. A method of encoding an image, comprising:
determining initial motion information of a current block based on a merge candidate list including a plurality of merge candidates;
determining delta motion information of the current block based on a sum of absolute difference (SAD) list for a search area, the SAD list including a plurality of SAD candidates;
updating the initial motion information of the current block based on the delta motion information; and
performing inter prediction on the current block based on the updated initial motion information,
wherein deriving the delta motion information is performed based on a comparison result between a reference SAD candidate and a predetermined threshold,
wherein the reference SAD candidate is representative of a SAD candidate corresponding to a non-directional offset, and
wherein when the reference SAD candidate is greater than or equal to the predetermined threshold, deriving the delta motion information comprises:
    identifying a SAD candidate having a minimum value among the SAD candidates belonging to the SAD list; and
    determining the delta motion information based on an offset corresponding to the identified SAD candidate.

6. A method of transmitting a bitstream, comprising:
determining initial motion information of a current block based on a merge candidate list including a plurality of merge candidates;
determining delta motion information of the current block based on a sum of absolute difference (SAD) list for a search area, the SAD list including a plurality of SAD candidates;
updating the initial motion information of the current block based on the delta motion information;
generating a prediction block of the current block by performing inter prediction on the current block based on the updated initial motion information;
generating a residual block of the current block based on the prediction block;
encoding the residual block to generate the bitstream; and
transmitting the bitstream,
wherein deriving the delta motion information is performed based on a comparison result between a reference SAD candidate and a predetermined threshold,
wherein the reference SAD candidate is representative of a SAD candidate corresponding to a non-directional offset, and
wherein when the reference SAD candidate is greater than or equal to the predetermined threshold, deriving the delta motion information comprises:
    identifying a SAD candidate having a minimum value among the SAD candidates belonging to the SAD list; and
    determining the delta motion information based on an offset corresponding to the identified SAD candidate.

\* \* \* \* \*